US012003564B1

(12) United States Patent
Waggoner et al.

(10) Patent No.: US 12,003,564 B1
(45) Date of Patent: Jun. 4, 2024

(54) PREDICTED PRESENTED QUALITY METRICS

(71) Applicant: Amazon Technologies, Inc., Seattle, WA (US)

(72) Inventors: Charles Benjamin Waggoner, Portland, OR (US); Nandini Iyer, Fremont, CA (US); Joel Peter Korpi, Hewitt, TX (US); Ophir Hechter, London (GB)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/548,092

(22) Filed: Dec. 10, 2021

(51) Int. Cl.
| | | |
|---|---|---|
| H04L 65/75 | (2022.01) | |
| H04L 65/70 | (2022.01) | |
| H04L 65/80 | (2022.01) | |
| H04N 21/24 | (2011.01) | |
| H04N 21/2662 | (2011.01) | |

(52) U.S. Cl.
CPC .............. *H04L 65/70* (2022.05); *H04L 65/75* (2022.05); *H04L 65/80* (2013.01); *H04N 21/2402* (2013.01); *H04N 21/2662* (2013.01)

(58) Field of Classification Search
CPC ......... H04L 65/70; H04L 65/75; H04L 65/80; H04N 21/2402; H04N 21/2662
See application file for complete search history.

(56) References Cited

U.S. PATENT DOCUMENTS

| | | | | |
|---|---|---|---|---|
| 9,396,738 B2 * | 7/2016 | Abdelal | ................... | G10L 25/69 |
| 10,666,529 B2 * | 5/2020 | Lundberg | ............ | H04L 41/5067 |
| 10,708,667 B1 | 7/2020 | Waggoner et al. | | |
| 11,343,492 B2 | 5/2022 | Chadwick et al. | | |
| 2008/0260042 A1 | 10/2008 | Shah et al. | | |
| 2012/0137016 A1 * | 5/2012 | Hsu | ..................... | H04N 21/4126 709/231 |
| 2012/0206610 A1 * | 8/2012 | Wang | ................... | H04N 17/004 348/184 |
| 2014/0358526 A1 * | 12/2014 | Abdelal | ................. | H04L 65/80 704/202 |

(Continued)

OTHER PUBLICATIONS

Github, "VMAF—Video Multi-Method Assessment Fusion," www. github.com, 2021, GitHub, Inc., 4 pages, 2021, URL: https://github.com/Netflix/vmaf, obtained Dec. 16, 2021.

(Continued)

*Primary Examiner* — Oanh Duong
(74) *Attorney, Agent, or Firm* — Athorus, PLLC

(57) ABSTRACT

Disclosed are systems and methods to deliver media files at a highest perceived presented quality. Rather than measure quality as a difference between an encoded version of the media file and the original version of the media file, in accordance with the disclosed implementations, quality is based on a presented quality of each fragment of a media file when presented by a device to a user. The disclosed implementations determine a presented quality score for each fragment of a media file, the presented quality score indicative of a predicted quality of the fragment as perceived by a user when the fragment is presented. The presented quality score may be determined based on one or more of a bitrate used to encode the media segment, a device type of a device used to present the media segment, the content of the segment itself, etc.

20 Claims, 18 Drawing Sheets

(56) References Cited

U.S. PATENT DOCUMENTS

| | | | |
|---|---|---|---|
| 2015/0023404 A1 | 1/2015 | Li et al. | |
| 2015/0039680 A1* | 2/2015 | Gallant | H04L 12/1439 709/231 |
| 2016/0088322 A1* | 3/2016 | Horev | H04N 21/2402 725/14 |
| 2020/0195994 A1 | 6/2020 | Eluvan et al. | |
| 2020/0296362 A1 | 9/2020 | Chadwick et al. | |
| 2020/0314503 A1 | 10/2020 | Wang et al. | |
| 2020/0351533 A1* | 11/2020 | Bampis | H04N 21/251 |
| 2021/0021660 A1* | 1/2021 | Lewis | H04N 21/47217 |
| 2021/0058625 A1* | 2/2021 | Li | H04N 19/59 |
| 2021/0067818 A1* | 3/2021 | Sen | H04N 21/8456 |
| 2021/0174390 A1* | 6/2021 | Golan | G06Q 30/0241 |
| 2021/0258652 A1* | 8/2021 | Li | H04L 41/0686 |
| 2021/0306401 A1* | 9/2021 | Su | H04N 21/44209 |
| 2022/0030229 A1* | 1/2022 | Chadwick | G06V 10/764 |
| 2022/0030247 A1 | 1/2022 | Olekas et al. | |

OTHER PUBLICATIONS

Li, Z., et al., "Towards a Practical Perceptual Video Quality Metric," www.netflixtechblog.com, Netflix Technology Blog, Netflix TechBlog, 22 pages, Jun. 16, 2016, URL: https://netflixtechblog.com/toward-a-practical-perceptual-video-quality-metric-653f208b9652, obtained Dec. 16, 2021.

Qin, Y., et al., "Quality-aware Strategies for Optimizing ABR Video Streaming QoE and Reducing Data Usage," MMSys: ACM Multimedia Systems, MMSys '19, Jun. 18-21, 2019, Amherst, Massachusetts, USA, Association for Computing Machinery, URL: https://nlab.engr.uconn.edu/papers/quad.pdf, 12 pages.

Wikipedia, "Adaptive bitrate streaming," www.wikipedia.com, Wikipedia: The Free Encyclopedia, 10 pages, Sep. 29, 2021, URL: https://en.wikipedia.org/wiki/Perceptual_Evaluation_of_Video_Quality, obtained Dec. 16, 2021.

Wikipedia, "Perceptual Evaluation of Video Quality," www.wikipedia.com, Wikipedia: The Free Encyclopedia, 2 pages, Apr. 13, 2020, URL: https://en.wikipedia.org/wiki/Perceptual_Evaluation_of_Video_Quality, obtained Dec. 16, 2021.

* cited by examiner

| ENCODED FRAGMENT | BITRATE | VIDEO SEGMENT ||||||
|---|---|---|---|---|---|---|---|
| | | DEVICE TYPE 1 | DEVICE TYPE 2 | DEVICE TYPE 3 | DEVICE TYPE 4 | DEVICE TYPE 5 | DEVICE TYPE 6 |
| EF1-7 | 14 MBPS - 100 MBPS | 75 | 85 | 93 | 100 | 140 | 170 |
| EF1-6 | 8000-14000 BPS | 75 | 85 | 93 | 100 | 140 | 140 |
| EF1-5 | 4000-8000 KBPS | 75 | 85 | 93 | 100 | 100 | 100 |
| EF1-4 | 1500-4000 KBPS | 75 | 85 | 93 | 93 | 93 | 93 |
| EF1-3 | 1200-1500 KBPS | 75 | 85 | 85 | 85 | 85 | 85 |
| EF1-2 | 800 - 1200 KBPS | 75 | 75 | 75 | 75 | 75 | 75 |
| EF1-1 | 400KBPS | 45 | 45 | 45 | 45 | 45 | 45 |

PRESENTED QUALITY SCORE

| DEVICE TYPE 1 820-1 | |
|---|---|
| SEGMENT | AVAILABLE FRAGMENTS |
| SEGMENT 1 | EF1-2 (75); EF1-1 (45) |
| SEGMENT 2 | EF2-3 (75); EF2-1 (45) |
| SEGMENT 3 | EF3-2 (75) |
| SEGMENT 4 | EF4-2 (75) |
| SEGMENT 5 | EF5-1 (75) |
| ⋮ | ⋮ |

800-1 → SEGMENT 1 — 802-1
800-2 → SEGMENT 2 — 802-2
800-3 → SEGMENT 3 — 802-3
800-4 → SEGMENT 4 — 802-4
800-5 → SEGMENT 5 — 802-5

| DEVICE TYPE 5 820-5 | |
|---|---|
| SEGMENT | AVAILABLE FRAGMENTS |
| SEGMENT 1 | EF1-6 (140); EF1-4(93); EF1-2(75); EF1-1(45) |
| SEGMENT 2 | EF2-6 (140); EF2-5(93); EF2-4(45) |
| SEGMENT 3 | EF3-4(140); EF3-2(93); EF3-1(45) |
| SEGMENT 4 | EF4-4(140); EF4-2(93); EF4-1(45) |
| SEGMENT 5 | EF5-1 (140) |
| ⋮ | ⋮ |

800-1 → SEGMENT 1 — 812-1
800-2 → SEGMENT 2 — 812-2
800-3 → SEGMENT 3 — 812-3
800-4 → SEGMENT 4 — 812-4
800-5 → SEGMENT 5 — 812-5

PREDICTED PRESENTED QUALITY METRICS

BACKGROUND

Historically, video and audio streaming have presumed that quality was proportional to bitrate. However, different types of content can require very different bitrates to deliver perceptually equivalent quality.

Attempts have been made to address this problem. For example, Video Multimethod Assessment Fusion (VMAF) is a metric that predicts video quality based on a reference and distorted video sequence. However, VMAF is not really a quality metric, but a distortion metric, because it measures how degraded an encode is compared to the reference or source. This yields cases in which a very accurate encode of a poor quality source is scored higher than a good quality encode of an excellent source, despite the latter being obviously preferable by a customer.

BRIEF DESCRIPTION OF THE FIGURES

FIG. 7 is a table indicating presented quality media scores for a video segment presented on different device types, in accordance with disclosed implementations.

FIG. 8A is a table indicating different available fragments for different segments of a media file that are available to a device of a first device type for selection and presentation, in accordance with disclosed implementations.

FIG. 8B is a table indicating different available fragments for the same different segments of the media file that are available to a device of the fifth device type for selection and presentation, in accordance with disclosed implementations.

DETAILED DESCRIPTION

Figure 1:
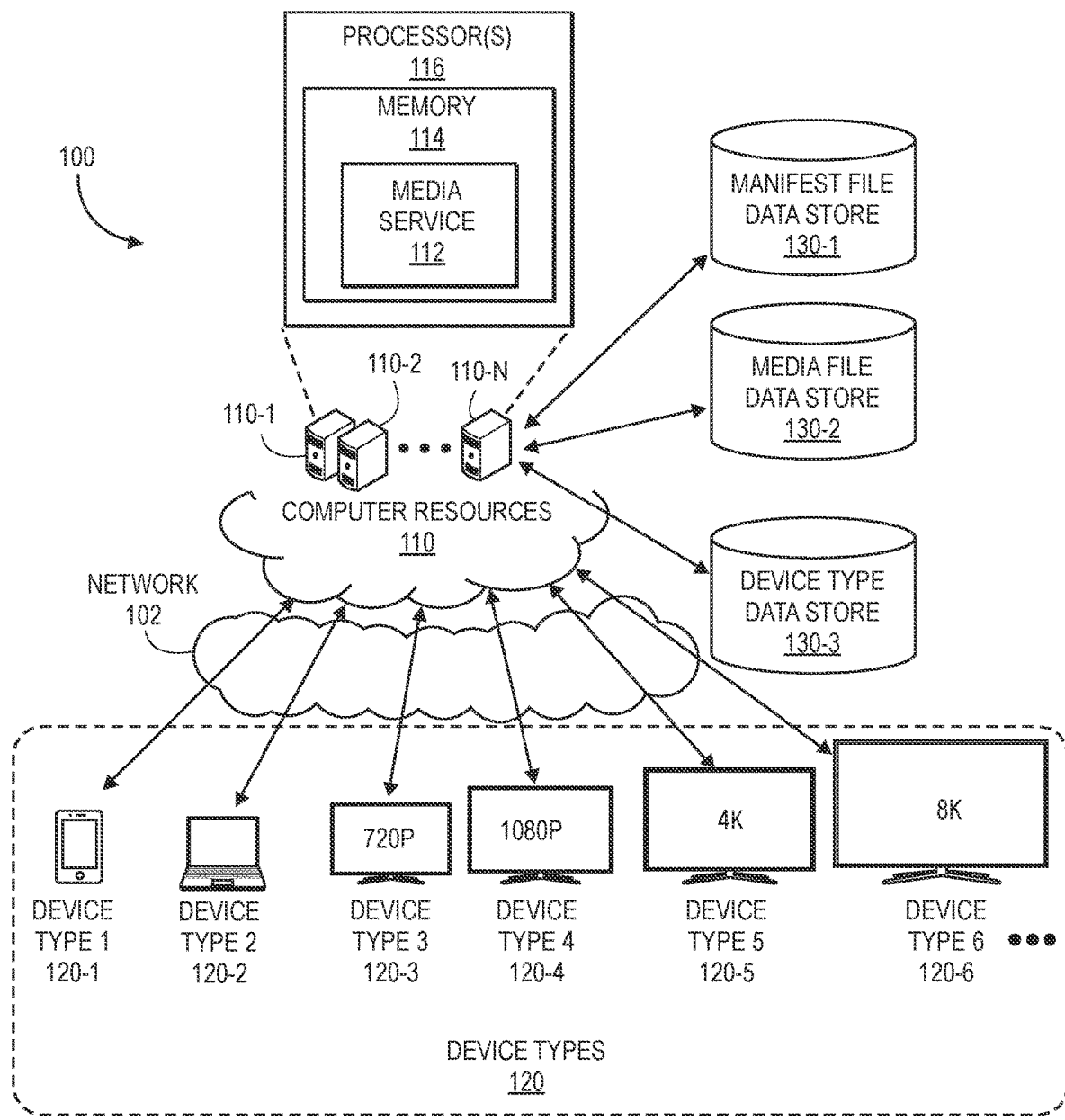
FIG. 1 is an illustration of an environment for delivering and presenting media file segments according to a presented quality score, in accordance with disclosed implementations.

Disclosed are systems and methods to deliver media content, referred to herein as media files, at a highest perceived presented quality. Rather than measure quality as a difference between an encoded version of the media file and the original version of the media file, in accordance with the disclosed implementations, quality is based on a presented quality of each fragment of a media file when presented by a device to a user. In particular, the disclosed implementations determine a presented quality score for each fragment of a media file, the presented quality score indicative of a predicted quality of the fragment as perceived by a user when the fragment is presented. As discussed further below, the presented quality score may be determined based on one or more of a bitrate used to encode the segment into a fragment, a device type of a device used to present the fragment, the content of the fragment itself, etc. For example, a fragment of a media file may be provided to a trained deep neural network ("DNN") and the DNN may generate a presented quality score for one or more device types, each presented quality score indicative of a predicted quality of the fragment as perceived by a user when the fragment is presented by a device of that device type.

As discussed further below, a presented quality score may be determined for each of a plurality of different fragments of each of a plurality of different segments of a media file. One or more manifest files may then be created for the media file that indicate, among other information, the presented quality score determined for the fragments of the media file. In some implementations, different manifest files may be created for different device types such that only a subset of the fragments of the media file are indicated as available fragments for devices of a device type. As discussed below, the availability of fragments for devices of a device type may be dependent upon the presented quality score determined for those fragments when presented by the device type. For example, if the device type is a portable device with a small display screen and the media file is a video, the presented quality score may be set to a highest value for a plurality of different fragments, regardless of the bitrate used to encode those segments, because the perceived quality of different encodings may be imperceptible when presented on the small display of the portable device. As such, the manifest file created for the portable device type may only indicate fragments with quality scores up to a fragment having a highest quality score with the lowest bitrate used to encode the segment. In other examples, if there are two or more fragments that have quality scores that are similar or within a defined range of a highest quality score, one of those fragments may be indicated on the manifest file, not necessarily the fragment having the highest quality score. For example, if there are three fragments of a segment with quality scores that are within a defined range of a highest quality score of a fragment, the fragment with the lowest bitrate (smallest file size) may be indicated on the manifest file.

As discussed further below, a device or application executing on a device may receive a manifest file and select fragments to obtain (e.g., download, stream, etc.) based at least in part on the presented quality score indicated in the manifest file for different available fragments of each segment of the media file. As a result, a highest perceived presented quality may be obtained and presented to a user by the device while at the same time reducing the download bandwidth required to download segments of the media file and/or reducing memory required to store the media file.

Still further, in some implementations, estimated parameters may be determined for a device type and media file indicating, among other information, a presented quality of the media file when presented by a device of the device type, a time required by the device to obtain segments of the media file and begin presentation of the media file, a presented quality of the media file at initiation of the presentation of the media file, a re-buffering risk with respect to the media file, a latency in obtaining fragments of the media file, etc. Likewise, similar actual parameters may be measured and determined for the media file and device type as the media file is obtained and presented by a device of the device type. The estimated parameters and actual parameters may then be compared to determine one or more parameter accuracy scores for the media file and/or device type. Those parameter accuracy scores may be combined and/or aggregated with other parameter accuracy scores determined for other devices of the same device type, other instances of the media file being obtained by devices, etc. Likewise, as discussed further below, one or more actions may be performed based at least in part on one or more of the parameter accuracy scores and/or one or more of the aggregated parameter accuracy scores.

FIG. 1 is an illustration of an environment 100 for delivering and presenting media file segments according to a presented quality score, in accordance with disclosed implementations.

As illustrated, a media service 112 may provide media files, such as media files maintained in a media file data store 130-2 to one or more devices of any of a variety of device types 120. A media file, as used herein, may include a video media file, an audio media file, audio/video media file, an image, a trick play file, a thumbnail file, a subtitles file, a captions file, a metadata file, a virtual reality content file, or any other form of media file that may be sent, streamed, downloaded, or otherwise provided by the media service 112 to one or more devices of any of a variety of device types 120. For ease of discussion, the majority of the examples discussed herein relate to video media files. However, the disclosed implementations are equally applicable to any type of media file and are not limited to video media files.

As discussed in further detail below, the media service 112 may maintain a plurality of media files in one or more media file data stores 130-2. Segments of those media files may likewise be encoded into one or more different fragments, the fragments encoded at different bitrates, as is known in the art. Likewise, one or more manifest files may be generated for each media file and maintained in the manifest file data store 130-1 that is accessible by the media service 112. Each manifest file may indicate, among other information, fragments of each media file that are available for a device to obtain for presentation by the device. In addition, the manifest file for a media file may include an indication of a presented quality score that has been determined for each fragment indicated in the manifest file.

In some implementations, different manifest files may be created for different device types 120 such that each media file may be associated with a plurality of different manifest files. For example, a first manifest file may be created for a first media file and a first device type 120-1, a second manifest file may be created for the first media file and a second device type 120-2, a third manifest file may be created for the first media file and a third device type 120-3, a fourth manifest file may be created for the first media file and a fourth device type 120-4, a fifth manifest file may be created for the first media file and a fifth device type 120-5, a sixth manifest file may be created for the first media file and a sixth device type 120-6, etc. As discussed further below, each manifest file may indicate different available fragments for each segment of a media file that are available to each of the different device types.

Likewise, a device type data store 130-3 that is accessible to the media service 112 may also be maintained that includes information about each device type 120 for which media files may be provided by the media service 112. The device type data store 130-3 may maintain any type of information for different device types 120 in the device type data store 130-3 that may be useful by the media service in determining available fragments for the device type, determining presented quality scores for different fragments for the different devices, etc. For example, the device type data store 130-3 may be used to maintain information indicating a processing capability of each device type 120, a display size and/or display type of each device type, an audio output capability of each device type, etc. As discussed further below, device type information may be used by a trained DNN to determine presented quality scores for different fragments for each of the different device types.

Any number of device types 120 may be defined and used in accordance with the disclosed implementations. In one example, device types 120 may be defined for groups of similar devices. For example, a first device type 120-1 may be defined for all handheld devices (e.g., cell phones, smart phones, small tablets, etc.) and/or wearable devices having a display size up to a first defined display size or capability of less than a first defined amount. A second device type 120-2 may be defined for all portable devices, such as laptops, larger tablets, etc., having a display size or capability between the first defined amount and a second defined amount. A third device type 120-3 may be defined for devices having a display size or capability (e.g., 720p) between the second defined amount and a third defined amount. A fourth device type 120-4 may be defined for devices having a display size or capability (e.g., 1080p) between the third defined amount and a fourth defined amount. A fifth device type 120-5 may be defined for devices having a display size or capability (e.g., 4k) between the fourth defined amount and a fifth defined amount. A sixth device type 120-6 may be defined for devices having a display size or capability (e.g., 8k) between the fifth defined amount and a sixth defined amount. As will be appreciated, any number or configuration of device types 120 may be utilized with the disclosed implementations. Examples of other device types that may be utilized with the disclosed implementations include, but are not limited to, cinema projectors, home theater projectors, wearables, virtual reality devices, emissive displays, emissive display arrays, etc. In addition, with the disclosed implementations, as newer devices with newer capabilities and/or dimensions are created, additional device types may be established for those new device types.

The media service 112 may execute on one or more computing resource(s) 110. The computing resource(s) 110 may be remote from devices of different device types 120 and each device of any device type may be remote from other devices of the same or different device types. Likewise, the computing resource(s) 110 and devices of the different device types 120 may be configured to communicate over a network 102.

As illustrated, the computing resource(s) 110 may be implemented as one or more servers 110(1), 110(2), . . . , 110(N) and may, in some instances, form a portion of a network-accessible computing platform implemented as a computing infrastructure of processors, storage, software, data access, and so forth that is maintained and accessible by components/devices of the system via a network 102, such as an intranet (e.g., local area network), the Internet, etc.

The server system(s) 110 does not require end-user knowledge of the physical location and configuration of the system that delivers the services. Common expressions associated for these remote computing resource(s) 110 include "on-demand computing," "software as a service (SaaS)," "platform computing," "network-accessible platform," "cloud services," "data centers," and so forth. Each of the servers 110(1)-(N) include one or more processors 116 and memory 114, which may store or otherwise have access to the media service 112, as described herein.

The network 102, and each of the other networks discussed herein, may utilize wired technologies (e.g., wires, USB, fiber optic cable, etc.), wireless technologies (e.g., radio frequency, infrared, NFC, cellular, satellite, Bluetooth, etc.), or other connection technologies. The network 102 is representative of any type of communication network, including data and/or voice network, and may be implemented using wired infrastructure (e.g., cable, CAT6, fiber optic cable, etc.), a wireless infrastructure (e.g., RF, cellular, microwave, satellite, Bluetooth, etc.), and/or other connection technologies.

Figure 2:
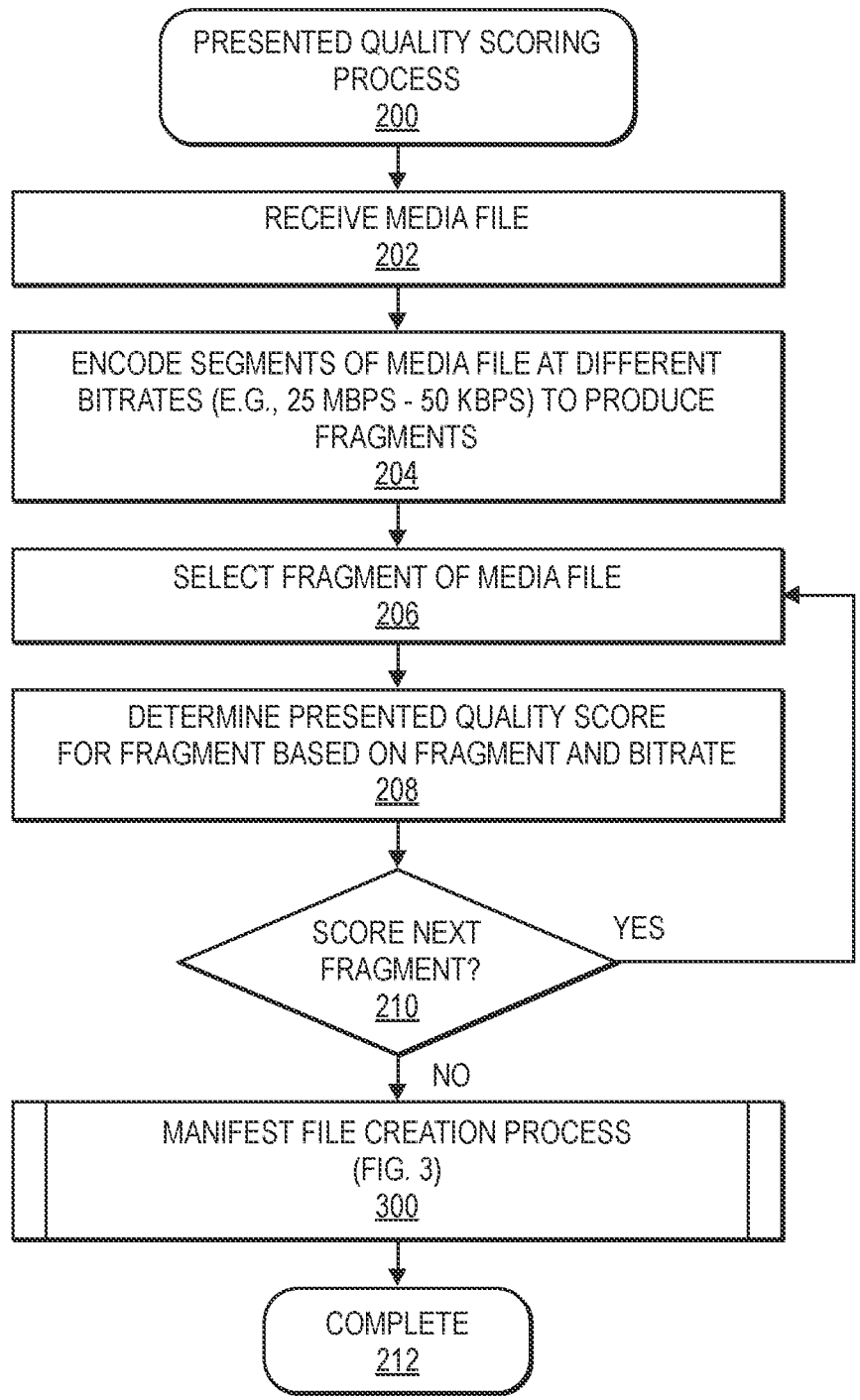
FIG. 2 is an example presented quality scoring process, in accordance with disclosed implementations.

FIG. 2 is an example presented quality scoring process 200, in accordance with disclosed implementations. The example process may be performed by the media service as new media files are received by the media service. Alternatively, or additionally, the example process may be performed by the media service on existing media files, for example as new encoding schemes become available.

The example process 200 begins upon receipt or access of a media file, such as a movie, audio recording, etc., as in 202. For example, the media service may periodically receive or be granted access to new releases of movies or other media files that are to be made available through the media service.

Upon receipt or access to a media file, the segments of the media file may be encoded at different bitrates to produce a plurality of fragments for the segment, each fragment encoded at a different bitrate, as in 204. Any of a variety of encoding schemes, such as MP4, AAC, H.264, etc., may be utilized with the disclosed implementations. Likewise, each segment may be encoded at any of a variety of bitrates. In one example, each segment may be encoded into twelve different fragments, each fragment encoded at a different bitrate (e.g., 300 kilobits per second ("kbps"), 500 kbps, 1,000 kbps, 1,500 kbps, 2,250 kbps, 3,000 kbps, 4,500 kbps, 6,000 kbps, 9,000 kbps, 13,000 kbps, 20,000 kbps, 25,000 kbps, etc.). In some implementations, the content of the segment may be considered and additional or fewer fragments encoded. For example, if the segment is mostly a black image, only a few segments may be encoded as the image will appear approximately the same at different bitrates. Comparatively, if a fragment is part of a video file and relates to a detailed segment of the video file, more fragments may be encoded as the presentation of the file may look very different at different bitrates. In some implementations, a segment may be encoded into a single fragment.

As segments are encoded into fragments, or after encoding all of the segments into different fragments, a fragment of the media file may be selected, as in 206, and a presented quality score determined for the fragment, as in 208. In the example discussed with respect to FIG. 2, the presented quality score for a fragment may be determined based on the fragment itself, such as the content of the fragment and the bitrate used to encode the fragment. For example, the fragment and the bitrate of the encoding may be provided to a trained DNN that may process the fragment and the bitrate to determine a presented quality score for the fragment. The presented quality score, as used herein, may be any value or indicator that is indicative of a predicted quality of the fragment when presented by a device to a user. In some implementations, the presented quality score may be a numerical value. In other implementations, the presented quality score may be a different indicator of quality (e.g., low, medium, high). For example, in some implementations, presented quality scoring codes may be maintained and the DNN may be configured to output a score for an input fragment that corresponds to one of the presented quality scoring codes. In other implementations, the DNN may output any number corresponding to an absolute quality score. In still other examples, other values or scoring codes may be utilized as indicative of a presented quality of the fragment.

As discussed further below, the DNN may be trained to process fragments along with bitrate information corresponding to the encoding and predict a presented quality score of the fragment when presented to a user. For example, the DNN may process the content of the fragment to determine the content to be presented and generate a presented quality score based at least in part on the content, in conjunction with the bitrate used to encode the fragment. In comparison to traditional systems, the presented quality score is based on the predicted presented quality of the fragment and not based on a comparison between the original source and the fragment. As such, different fragments of the same segment may, in some instances, receive the same or similar presented quality scores even though they are encoded at different bitrates. For example, a first fragment encoded at a low bitrate, and a second fragment encoded at a higher bitrate for a segment that has a high amount of motion such that the presented video is blurry during presentation of the segment, may both receive the same or similar presented quality scores. In comparison, traditional systems would provide different scores to those two encodings because of the difference between the source media file segment and the fragment, even though the presentation of the different fragments, when presented on a device to a user, are effectively indistinguishable.

After determining a presented quality score for a selected fragment, a determination is made as to whether a next fragment of the media file is to be scored, as in 210. If it is determined that a next fragment is to be scored, the example process 200 returns to block 206, selects the next fragment of the media file, and continues.

If it is determined that a next fragment of the media file is not to be scored, a manifest file creation process is performed, as in 300. The manifest file creation process 300 is discussed further below with respect to FIG. 3. Upon generation of the manifest file for the media file, the example process 200 completes, as in 212.

Figure 3:
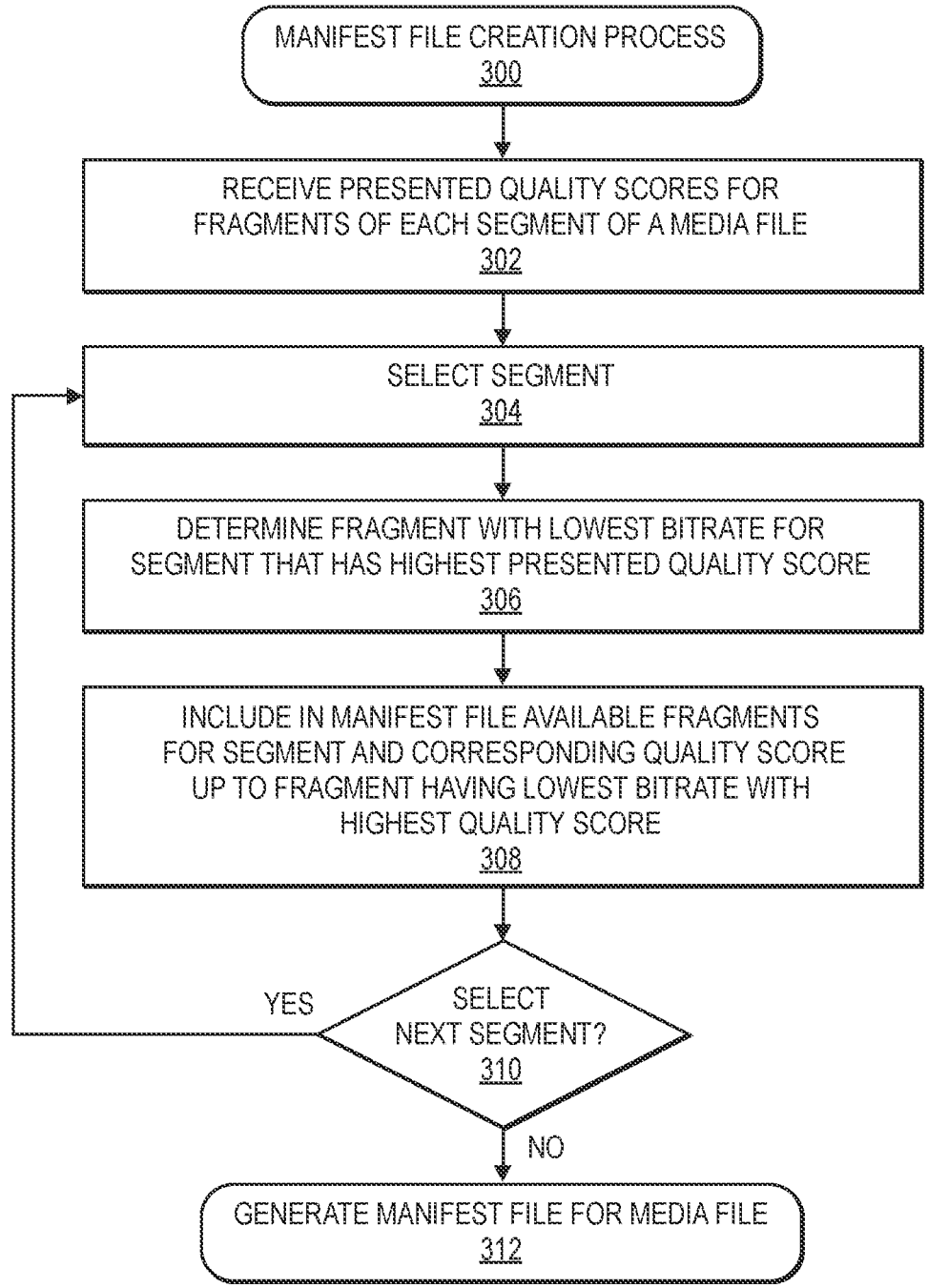
FIG. 3 is an example manifest file creation process, in accordance with disclosed implementations.

FIG. 3 is an example manifest file creation process 300, in accordance with disclosed implementations.

The example process 300 begins by receiving presented quality scores for each fragment for each segment of a media file, as in 302. As discussed above, each segment of a media file may be encoded into a plurality of different fragments, each fragment encoded at a different bitrate. Likewise, each fragment may be processed by a trained DNN and a corresponding presented quality score determined for the fragment.

The example process 300 may then select a segment, as in 304, and determine a fragment with a lowest bitrate that has a highest presented quality score among the fragments corresponding to the segment, as in 306. As discussed above, because the presented quality scores are indicative of a predicted quality of the fragment when presented, different fragments of the segment, even though encoded at different bitrates, may be assigned the same or similar presented quality score. For example, a blurry fast-moving scene of a segment may look the same when presented to a user regardless of whether the segment is encoded at 2250 kbps or 6000 kbps. In such an example, each of the two encoded bitrates (one encoded at 2250 kbps and one encoded at 6000 kbps) may be assigned the same or similar presented quality score.

The manifest file may then be updated to include as available fragments for the segment of the media file each fragment, up to the fragment having a lowest bitrate with the highest quality score among the fragments of the segment, as in 308. In addition, an indication of the quality score determined for each available fragment may also be included in the manifest file. By indicating in the manifest file fragments up to the fragment having the lowest bitrate with a highest quality score among the fragments allows a device that is accessing the manifest file to efficiently select a fragment to obtain and present.

In some implementations, rather than selecting a lowest bitrate fragment having a highest presented quality score, the example process 300 may determine if there are other fragments having a presented quality score that is within a defined range of the highest presented quality score determined for fragments of the segment. The defined range may be any defined range or value at which the difference in predicted presented quality is undiscernible. For example, the defined range may be a number value difference (e.g., 5 points), a percentage difference between the scores (e.g., 2.7%), a product of a function, a algorithmically determined defined range, etc. If it is determined that there are other fragments for the segment that have a presented quality score that is within the defined range, the fragment having the lowest bitrate from those fragments having quality scores within the defined range may be selected and identified in the manifest file instead of the fragment having the highest quality score, thereby reducing the size of the media file to be transmitted.

In still further examples, rather than indicating in the manifest file all fragments up to the fragment having the lowest bitrate with the highest quality score, or within a defined range of the highest quality score, in some implementations, not all fragments may be indicated in the manifest file. For example, if there are multiple fragments for the segment that have the same or similar (e.g., within a defined range) presented quality scores, not all of the fragments may be indicated in the manifest file. For example, if there are three fragments with the same or similar presented quality scores, only the fragment having the lowest bitrate of those three fragments may be indicated in the manifest file.

After indicating fragments in the manifest file for a segment, the example process 300 may then determine if a next segment of the media file is to be selected and processed, as in 310. If it is determined that a next segment is to be processed, the example process 300 returns to block 304, selects a next segment, and continues. If it is determined that a next segment is not to be processed, the manifest file for the media file is generated and the example process 300 completes, as in 312. As discussed above, the manifest file may be associated with the media file and maintained in a manifest file data store that is accessible to the media service.

Figure 4:
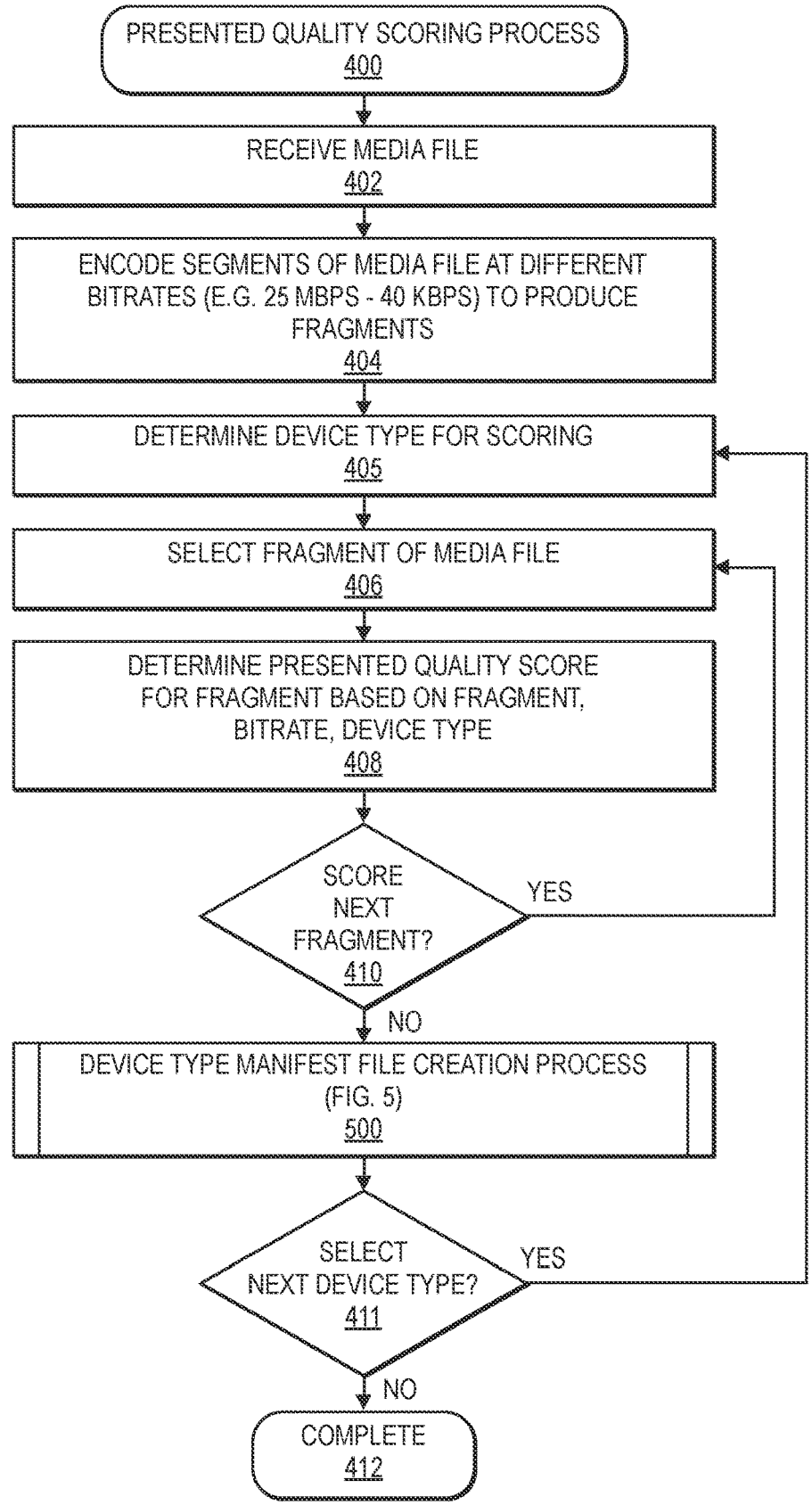
FIG. 4 is another example presented quality scoring process, in accordance with disclosed implementations.

FIG. 4 is another example presented quality scoring process 400, in accordance with disclosed implementations. Similar to the example process 200 discussed above with respect to FIG. 2, the example process 400 may be performed by the media service as new media files are received by the media service. Alternatively, or additionally, the example process 400 may be performed by the media service on existing media files, for example as new encoding schemes and/or device types become available. As discussed further below, in comparison to the example process 200, the example process 400 may consider a device type of a device for which a manifest file is being created as part of generating the presented quality scores and generation of the manifest files.

The example process 400 begins upon receipt or access of a media file, such as a movie, audio recording, etc., as in 402. For example, the media service may periodically receive or be granted access to new releases of movies or other media files that are to be made available through the media service.

Upon receipt or access to a media file, the segments of the media file may be encoded at different bitrates to produce a plurality of fragments for the segment, each fragment encoded at a different bitrate, as in 404. Any of a variety of encoding schemes, such as MP4, AAC, H.264, etc., may be utilized with the disclosed implementations. Likewise, each segment may be encoded at any of a variety of bitrates. In one example, each segment may be encoded into twelve different fragments, each fragment encoded at a different bitrate (e.g., 300 kilobits per second ("kbps"), 500 kbps, 1,000 kbps, 1,500 kbps, 2,250 kbps, 3,000 kbps, 4,500 kbps, 6,000 kbps, 9,000 kbps, 13,000 kbps, 20,000 kbps, 25,000 kbps, etc.). In some implementations, the content of the segment may be considered and additional or fewer segments encoded. For example, if the segment is mostly a black image, only a few segments may be encoded as the image will appear approximately the same at different bitrates. Comparatively, if a fragment is part of a video file and relates to a detailed segment of the video file, more fragments may be encoded as the presentation of the file may look very different at different bitrates.

As segments are encoded into fragments, or after encoding of the segments into different fragments, a device type for which quality scores are to be determined is selected, as in 405. As discussed above, in some implementations, devices that may present media files may be classified into one of a plurality of device types.

For the selected device type, a fragment of the media file may be selected, as in 406, and a presented quality score determined for the fragment for the device type, as in 408. In the example discussed with respect to FIG. 4, the presented quality score for a fragment for the device type may be determined based on the fragment itself, such as the content of the fragment, information about the device type upon which the fragment may be presented (e.g., audio capabilities, display size, display type, display quality, processing power of the device, etc.), and/or the bitrate used to encode the fragment.

For example, the fragment, device type information, and/or the bitrate of the fragment may be provided to a trained DNN that may process the fragment, the device type information, and/or the bitrate to determine a presented quality score for the fragment when presented by a device of the device type.

As discussed further below, the DNN may be trained to process fragments along with device type information and bitrate information corresponding to the encoding and predict a presented quality score of the fragment when presented to a user on a device of the device type. For example, the DNN may process the content of the fragment to determine the content to be presented by a device of the device type and generate a presented quality score for the device type based at least in part on the content and the device type information, in conjunction with the bitrate used to encode the fragment. In comparison to traditional systems, the presented quality score is based on the ultimate presented quality of the fragment when presented on a device of the device type and not based on a comparison between the original source and the fragment. As such, different fragments of the same segment when presented on a same device type may, in some instances, receive the same or similar presented quality scores even though they are encoded at different bitrates. For example, a first fragment encoded at a low bitrate and a second fragment encoded at a higher bitrate for a segment that has a high amount of motion such that the presented video is blurry during presentation of the segment may both receive the same or similar presented quality scores. In comparison, traditional systems would provide different scores to those two encodings because of the difference between the source media file segment and the fragment, even though the presentation of the different fragments, when presented on a device to a user, are effectively indistinguishable. In addition, traditional systems do not even consider a device type upon which the segment may be presented.

After determining a presented quality score for a selected fragment, a determination is made as to whether a next fragment of the media file is to be scored for that device type, as in 410. If it is determined that a next fragment is to be scored for that device type, the example process 400 returns to block 406, selects the next fragment of the media file, and continues.

If it is determined that a next fragment of the media file is not to be scored, a device type manifest file creation process is performed, as in 500. The device type manifest file creation process 500 is discussed further below with respect to FIG. 5. Upon generation of the manifest file for the media file and the device type, a determination is made as to whether a next device type is to be selected for which presented quality scores for fragments of the media file are to be generated, as in 411. If it is determined that a next device type is to be selected and presented quality scores generated for the fragments for that device type, the example process 400 returns to block 405, selects a next device type, and continues. If it is determined that a next device type is not to be selected, the example process 400 completes, as in 412.

As a result of the example process 400, multiple presented quality scores may be determined for each fragment, one presented quality score for each device type. Likewise, multiple manifest files may be generated for a media file, one manifest file for each device type. As discussed below with respect to FIG. 5, each manifest file created for a media file may be specific to a particular device type, and when a device of a device type requests the media file, the manifest file corresponding to that device type may be provided to the requesting device.

Figure 5:
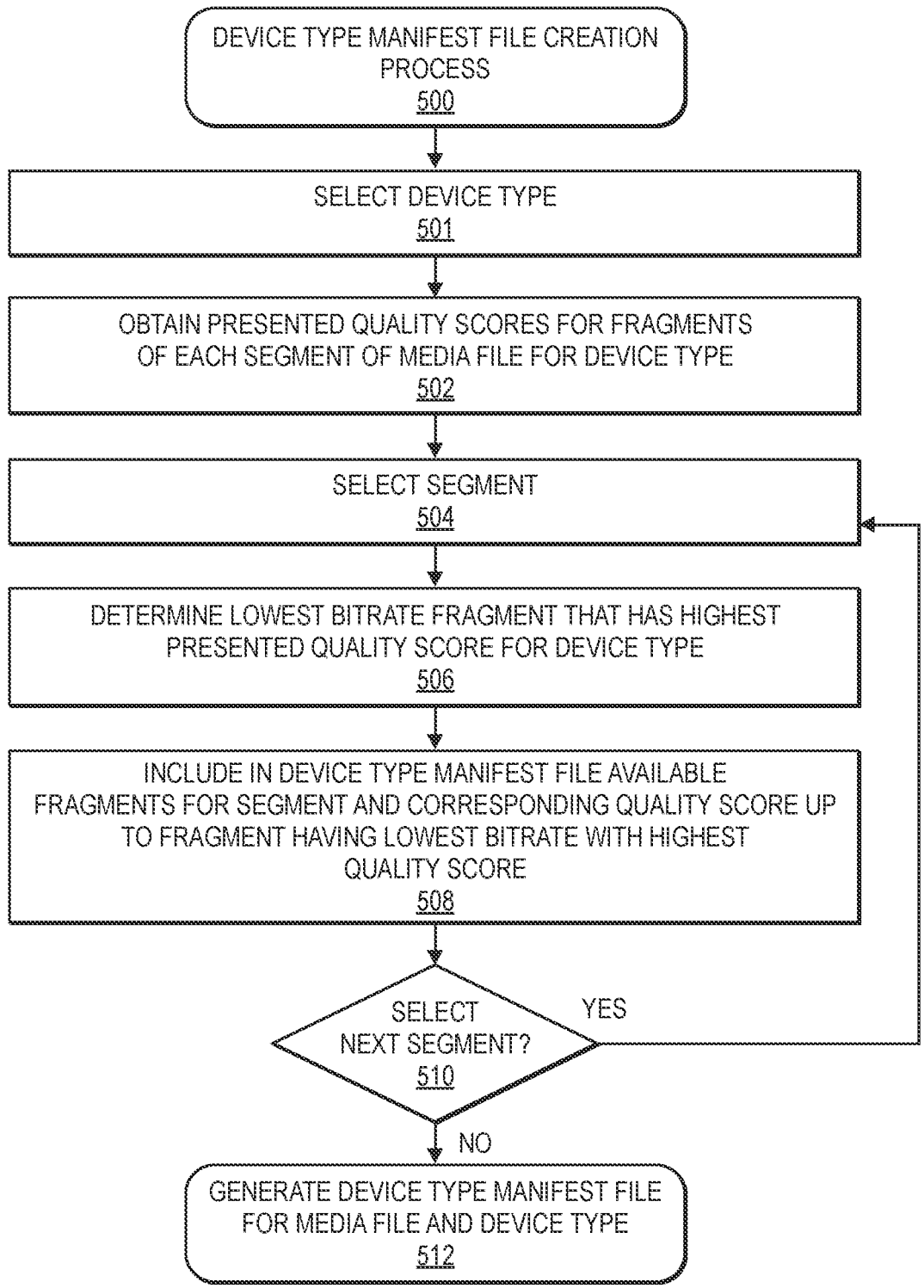
FIG. 5 is an example device type manifest file creation process, in accordance with disclosed implementations.

FIG. 5 is an example device type manifest file creation process 500, in accordance with disclosed implementations. The device type manifest file creation process 500 is similar to the manifest file creation process 300 discussed above with respect to FIG. 3 but may be performed in implementations in which multiple manifest files are created for a media file, as discussed above with respect to FIG. 4.

The example process 500 begins by selecting a device type for which a device type manifest file is to be created for a media file, as in 501. For the selected device type, presented quality scores for each fragment for each segment of a media file are obtained or received, as in 502. As discussed above, each segment of a media file may be encoded into a plurality of different fragments, each fragment encoded at a different bitrate. Likewise, each fragment may be processed by a trained DNN and a corresponding presented quality score determined for the fragment corresponding to the selected device type.

The example process 500 may then select a segment, as in 504, and determine a fragment with a lowest bitrate that has a highest presented quality score among the fragments corresponding to the segment for the device type, as in 506. As discussed above, because the presented quality scores are indicative of a predicted quality of the fragment when presented by the device type, different fragments of the segment, even though encoded at different bitrates, may be assigned the same or similar presented quality score for the device type. For example, a blurry fast-moving scene of a segment may look the same when presented to a user on the device type regardless of whether the segment is encoded at 2250 kbps or 6000 kbps. In such an example, each of the two encoded bitrates (one encoded at 2250 kbps and one encoded at 6000 kbps) may be assigned the same or similar presented quality score. As another example, if the device type has a small display and/or lower resolution display, two different fragments of a segment may have a similar or same presented quality score even though they are encoded at different bitrates. For example, if the device type corresponds to handheld devices with small displays, a fragment encoded at a 1,500 kbps may have the same presented quality score as a fragment encoded at 13,000 kbps, because both encodings may appear the same when presented on a smaller or lower resolution display of the device type.

The device type manifest file may then be updated to include as available fragments for the segment of the media file each fragment, up to the fragment having a lowest bitrate with the highest quality score among the fragments of the segment, as in 508. In addition, an indication of the quality score determined for each available fragment may also be included in the manifest file. By indicating in the manifest file fragments up to the fragment having the lowest bitrate with a highest quality score among the fragments allows a device of the device type that is accessing the manifest file to efficiently select a fragment to obtain and present.

In some implementations, rather than selecting a lowest bitrate fragment having a highest presented quality score, the example process 500 may determine if there are other fragments having a presented quality score that is within a defined range of the highest presented quality score determined for fragments of the segment. The defined range may be any defined range or value at which the difference in predicted presented quality is undiscernible. For example, the defined range may be a number value difference (e.g., 5 points), a percentage difference between the scores (e.g., 2.7%), or any other difference. If it is determined that there are other fragments for the segment that have a presented quality score that is within the defined range, the fragment having the lowest bitrate from those fragments having quality scores within the defined range may be selected and identified in the manifest file instead of the fragment having the highest quality score, thereby reducing the size of the media file to be transmitted.

In still further examples, rather than indicating in the manifest file all fragments up to the fragment having the lowest bitrate with the highest quality score, or within a defined range of the highest quality score, in some implementations, not all fragments may be indicated in the manifest file. For example, if there are multiple fragments for the segment that have the same or similar (e.g., within a defined range) presented quality scores, not all of the fragments may be indicated in the manifest file. For example, if there are three fragments with the same or similar presented quality scores, only the fragment having the lowest bitrate of those three fragments may be indicated in the manifest file.

After indicating fragments in the manifest file for a segment, the example process 500 may then determine if a next segment of the media file is to be selected and processed for the device type, as in 510. If it is determined that a next segment is to be processed, the example process 500 returns to block 504, selects a next segment, and continues. If it is determined that a next segment is not to be processed, the device type manifest file for the media file and device type is generated and the example process 500 completes, as in 512. As discussed above, the device type manifest file may be associated with the media file and/or device type and maintained in a manifest file data store that accessible to the media service.

In the implementations discussed with respect to FIG. 4 and FIG. 5, the example process 500 may be performed for each device type such that a device type manifest file for a media file is created for each device type.

Figure 6:
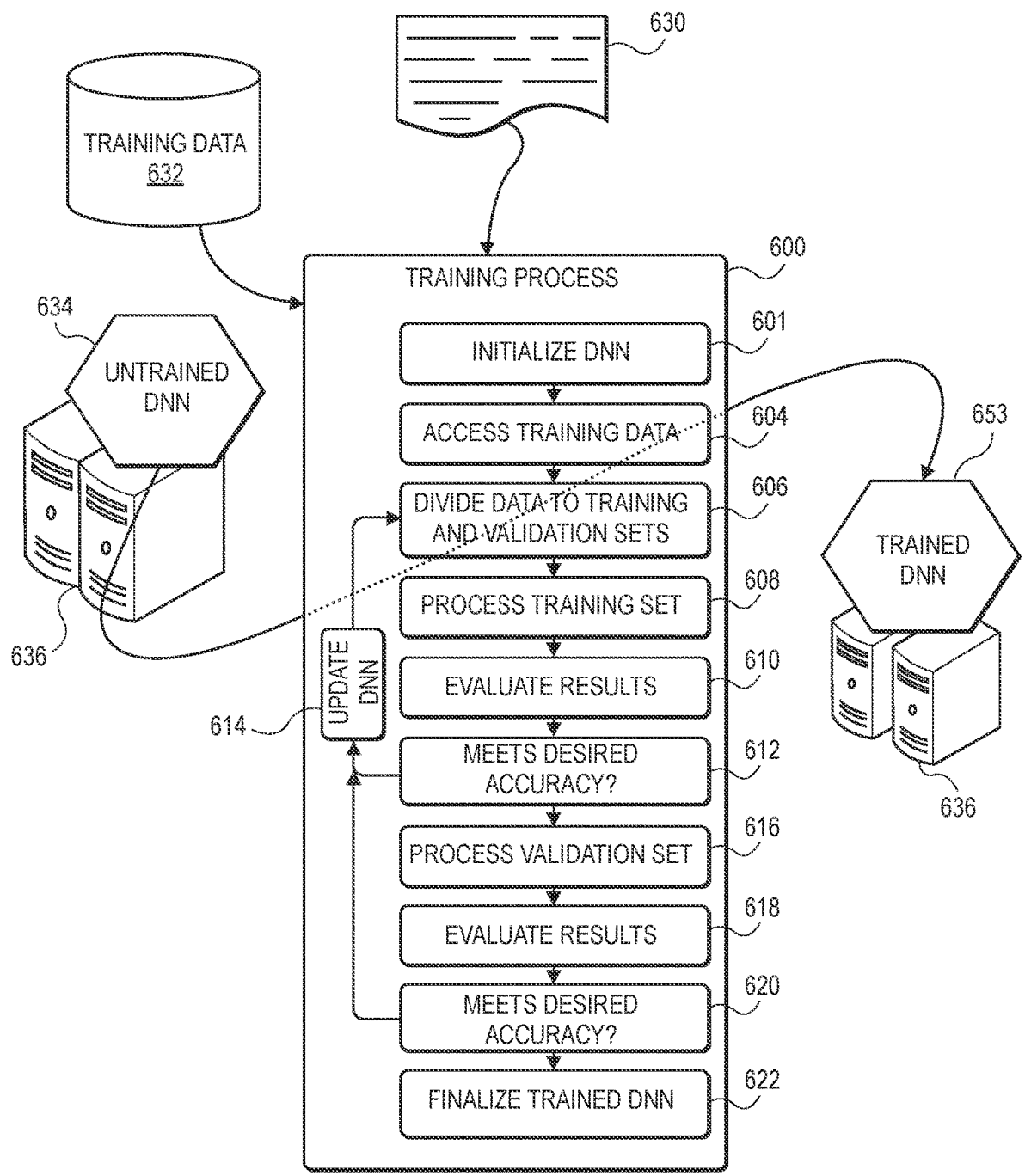
FIG. 6 is an example training process for training a deep neural network, in accordance with disclosed implementations.

FIG. 6 illustrates an exemplary overall process 600 of training a DNN in accordance with aspects of the disclosed subject matter. Indeed, as shown in FIG. 6, the training process 600 is configured to train an untrained DNN 634 operating on a computer system 636 to transform the untrained DNN into a trained DNN 653 that operates on the same or another computer system, such as a remote computing resource 636. In the course of training, as shown in the training process 600, at step 601, the untrained DNN 634 is initialized with training criteria 630. Training criteria 630 may include, but is not limited to, information as to a type of training, and number of layers to be trained, etc.

At step 604 of the training process 600, a corpus of training data 632, which may include fragments of a media file, bitrate information, and/or device type information, is accessed. For example, if training is to generate a trained DNN 653 that outputs a presented quality score for a fragment indicative of a predicted quality of the fragment as perceived by a user when the fragment is presented by a device type, the training data 632 may include fragments with corresponding presented quality scores for the device type. In another example, if the DNN is to be trained to output presented quality scores for each of a plurality of device types in response to an input of a fragment, the training data 632 may include fragments with corresponding quality scores for each of the device types for which the DNN is to be trained.

While the disclosed implementations discuss the use of labeled training data, meaning data that includes corresponding presented quality scores, in other implementations, the training data 632 may also or alternatively include unlabeled training data.

With the training data 632 accessed, at step 606 the training data is divided into training and validation sets. Generally speaking, the items of data in the training set are used to train the untrained DNN 634 and the items of data in the validation set are used to validate the training of the DNN. As those skilled in the art will appreciate, and as described below in regard to much of the remainder of training process 600, there are numerous iterations of training and validation that occur during the training of the DNN.

At step 608 of the training process, the data items of the training set are processed, often in an iterative manner. Processing the data items of the training set include capturing the processed results. After processing the items of the training set, at step 610, the aggregated results of processing the training set are evaluated, and at step 612, a determination is made as to whether a desired accuracy level has been achieved. If the desired accuracy level is not achieved, in step 614, aspects of the DNN are updated in an effort to guide the DNN to generate more accurate results, and processing returns to step 606, where a new set of training data 632 is selected, and the process repeats. Alternatively, if the desired accuracy level is achieved, the training process 600 advances to step 616.

At step 616, and much like step 608, the data items of the validation set are processed, and at step 618, the processing accuracy of this validation set is aggregated and evaluated. At step 620, a determination is made as to whether a desired accuracy level, in processing the validation set, has been achieved. If the desired accuracy level is not achieved, in step 614, aspects of the DNN are updated in an effort to guide the DNN to generate more accurate results, and processing returns to step 606. Alternatively, if the desired accuracy level is achieved, the training process 600 advances to step 622.

At step 622, a finalized, trained DNN 653 is generated. Typically, though not exclusively, as part of finalizing the now-trained DNN 653, portions of the DNN that are included in the model during training for training purposes are extracted, thereby generating a more efficient trained DNN 653.

In some implementations, the process 600 may be periodically performed to update training of an existing trained DNN 653 to include in the training newly defined device types and/or new bitrates used for encoding segments.

In some implementations, a single DNN may be trained to generate presented quality scores for each fragment encoded at different bitrates and for different device types. In other implementations, multiple DNNs may be trained. For example, a different DNN may be trained for each of the different bitrates for which segments may be encoded. As another example, a different DNN may be trained for each different device type for which presented quality scores are to be determined. In still another example, a different DNN may be trained for each different combination of bitrate encoding and device type for which presented quality scores are to be generated.

FIG. 7 is a table 700 indicating presented quality scores for a video segment presented on different device types, in accordance with disclosed implementations.

As discussed above, the presented quality scores may be absolute quality scores indicative of a predicted presented quality. Accordingly, as new devices are generated higher presented quality scores may be achieved by those devices. In other examples, other schemes or structures may be used for generating presented quality scores for different fragments of a segment. Likewise, the indication of six different device types 720-1, 720-2, 720-3, 720-4, 720-5, 720-6 for which the different presented quality scores are generated are provided only as examples.

In the illustrated table 700, the video segment has been encoded into seven different fragments 701-1, 701-2, 701-3, 701-4, 701-5, 701-6, 701-7, each fragment 701 encoded at a different bitrate 702. For example a first fragment 701-1 may be encoded at a bitrate of 400 kbps, a second fragment 701-2 may be encoded at a bitrate between 800-1,200 kbps, a third fragment 701-3 may be encoded at a bitrate between 1,200-1,500 kbps, a fourth fragment 701-4 may be encoded at a bitrate between 1,500-4,000 kbps, a fifth fragment 701-5 may be encoded at a bitrate between 4,000-8,000 kbps, a sixth fragment 701-6 may be encoded at a bitrate between 8,000-14,000 kbps, and a seventh fragment 701-7 may be encoded at a bitrate between 14,000 kbps-100 megabits per second ("Mbps"). In other examples, fewer or additional fragments may be generated at the same or different bitrates.

In the illustrated example presented with respect to the table 700, each fragment is processed by one or more DNNs and presented quality scores determined for each fragment for each device type 720-1, 720-2, 720-3, 720-4, 720-5, and 720-6. The device types 720-1 through 720-6 correspond to the example device types discussed above with respect to FIG. 1, namely device types 120-1 through 120-6.

As noted above, because the presented quality score for each device type and each fragment indicative of a predicted quality of the fragment as perceived by a user when the fragment is presented, for each device type one or more of the different fragments may receive the same or similar presented quality score. For example, referring first to the first device type 720-1, which in this example relates to handheld or wearable devices having a display size up to a first device display size or capability that is less than a first defined amount, several of the present quality scores for the different fragments 701 are the same. For example, each of the fragments 701-2 through 701-7 may receive a presented quality score of 75 because, regardless of the different bitrates used to encode the fragments 701-2 through 701-7, the presentation of those fragments by the first device type are each essentially the same due to the constraints of the first device type (i.e., the limited display size and/or capabilities).

In comparison, referring now to the second device type 720-2, fragments 701-3 through 701-7 may each receive a presented quality score of 85, while fragment 701-2 receives a presented quality score of 75, and fragment 701-1 receives a presented quality score of 45. Because the display size and/or capabilities between the first device type and the second device type are different, the presented quality scores for the same fragments may be different between the device types because the presentation of those same fragments will be different on the different device types. As yet another example, referring to the seventh device type 720-7, only the fragment 701-7, which is encoded with the highest bitrate, receives a highest presented quality score, in this example 170, and each of the other fragments receive lower presented quality scores. For the seventh device type 720-7, because of the display size and capabilities, a presented difference is apparent, as illustrated by the presented quality scores, between the different fragments 701-1 through 701-7.

FIG. 8A is a table 800 indicating different available fragments 802-1, 802-2, 802-3, 802-4, 802-5 for different segments 800-1, 800-2, 800-3, 800-4, 800-5 of a media file that are available to a device of a first device type 820-1 for selection and presentation, in accordance with disclosed implementations. In comparison, FIG. 8B is a table 810 indicating different available fragments 812-1, 812-2, 812-3, 812-4, 812-5 for the fragments 800-1, 800-2, 800-3, 800-4, 800-5 of the media file that are available to a device of the fifth device type 820-5 for selection and presentation, in accordance with disclosed implementations. The information indicated in the table 800 (FIG. 8A) and table 810 (FIG. 8B) may be included in respective manifest files for the first device type 820-1 and the fifth device type 820-5.

Turning first to FIG. 8A, for the first segment 800-1 for the first device type 820-1, which corresponds to the presented quality scores presented in the table 700 (FIG. 7) for the first fragment and the first device type, the available fragments are determined to include all fragments up to a highest scoring fragment having a lowest bitrate. In this example, the highest scoring segment having the lowest bitrate is EF1-2 with a presented quality score of 75. The other fragments indicated as available to devices of the first device type is EF1-1. In the illustrated example, because the presented quality scores for each of fragments EF1-2, EF1-3, EF1-4, EF1-5, EF1-6, and EF1-7 all received the same presented quality score, as indicated in table 700, only the fragment with the lowest bitrate for the video segment is indicated as available for the first device type 820-1 because there is no benefit in downloading or otherwise obtaining a higher bitrate fragment. As illustrated, for the other segments 800-2, 800-3, 800-4, 800-5 for the first device type 820-1 different fragments may be indicated as available based on the presented quality scores determined for those fragments.

In comparison, referring to FIG. 8B, which indicates available fragments for the same segments 800-1, 800-2, 800-3, 800-4, 800-5 for the same media file but for the fifth device type 820-5, different fragments are indicated as available. For example, in comparison to the available fragments for the first segment 800-1 for the first device 820-1, the fragments for the first segment that are available are EF1-6, EF1-4, EF1-2, and EF1-1. This difference in available fragments is due to the difference in presented quality scores determined for all of the fragments determined for the first segment for the different device types. In this example, because device type five 820-5 has a larger screen size and/or higher capabilities compared to the first device type 820-1, the presented quality scores for the different fragments will be different. Likewise, as illustrated, while the fragment having the lowest bitrate with the highest quality score, fragment EF1-6, not all of the other lower bitrate fragments are included in the manifest file. For example, it may be determined that the difference between the presented quality score of 100 for fragment EF1-5 and the presented quality score of 93 for fragment EF1-4 are within a defined range and thus the lower bitrate fragment (EF1-4) is the one of the two that is indicated in the manifest file. By reducing the number of available fragments indicated in a manifest file, the size of the manifest file is reduced, the memory requirements on the device are reduced, the processing required by the device to determine which fragments to select from the indicated available fragments in the manifest file is reduced, and the processing time is also reduced.

While the above example describes a manifest file with a reduced set of available fragments and corresponding quality scores for a device type, in other implementations, the manifest file may only include an indication of a single fragment for each segment of a media file for a particular device type, thereby minimizing the size of the manifest file and further reducing the processing needed by a device of the device type to determine which fragment to select for each segment of the media file. In other implementations, the manifest file may include, for example, an indication of every fragment for every segment of a media file and the presented quality scores determined for each of those fragments for every device type. Such a manifest file may be beneficial if the device type is unknown or if a target device (a device that will present the media file) is unknown or potentially different than the device that is downloading or streaming the media file. For example, a user may download or stream a media file to a portable device or laptop but the target device that is to present the media file may be a 4k large screen television. By including in a manifest file different device types and corresponding presented quality scores of fragments for those different device types, the device obtaining the media file may select the appropriate fragments to obtain.

As will be appreciated, any amount of information may be included in a manifest file, from an indication of a single available fragment per segment of a media file for a particular device, to an indication of all fragments of all segments for all device types, with corresponding presented quality scores for each of those fragments for each of the device types, to any amount of information therebetween. In some implementations, the manifest file may also include other information such as luma men/mean/maximum, and/or other metadata.

Figure 9A:
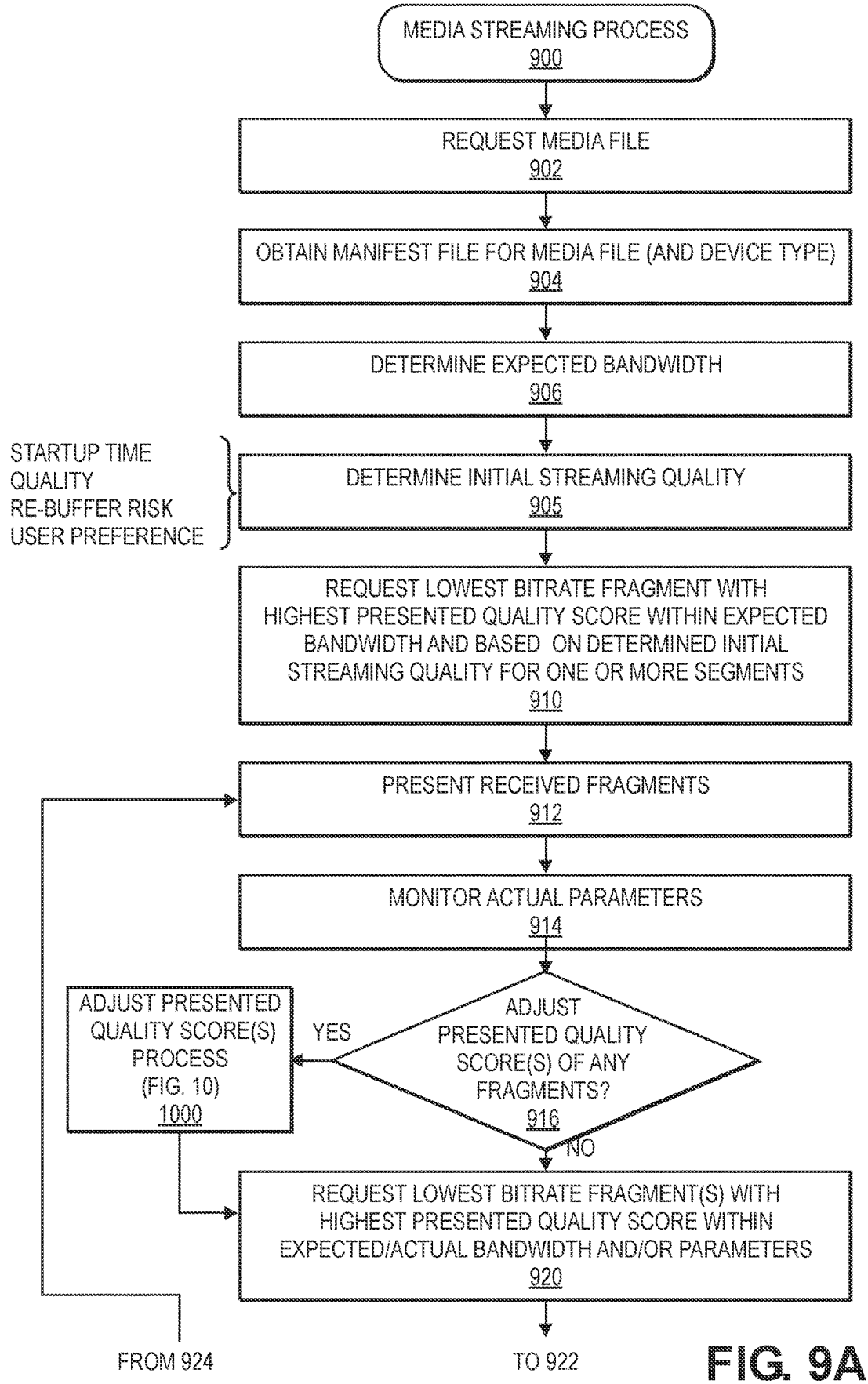
FIGS. 9A-9B are an example media streaming process, in accordance with disclosed implementations.
Figure 9B:
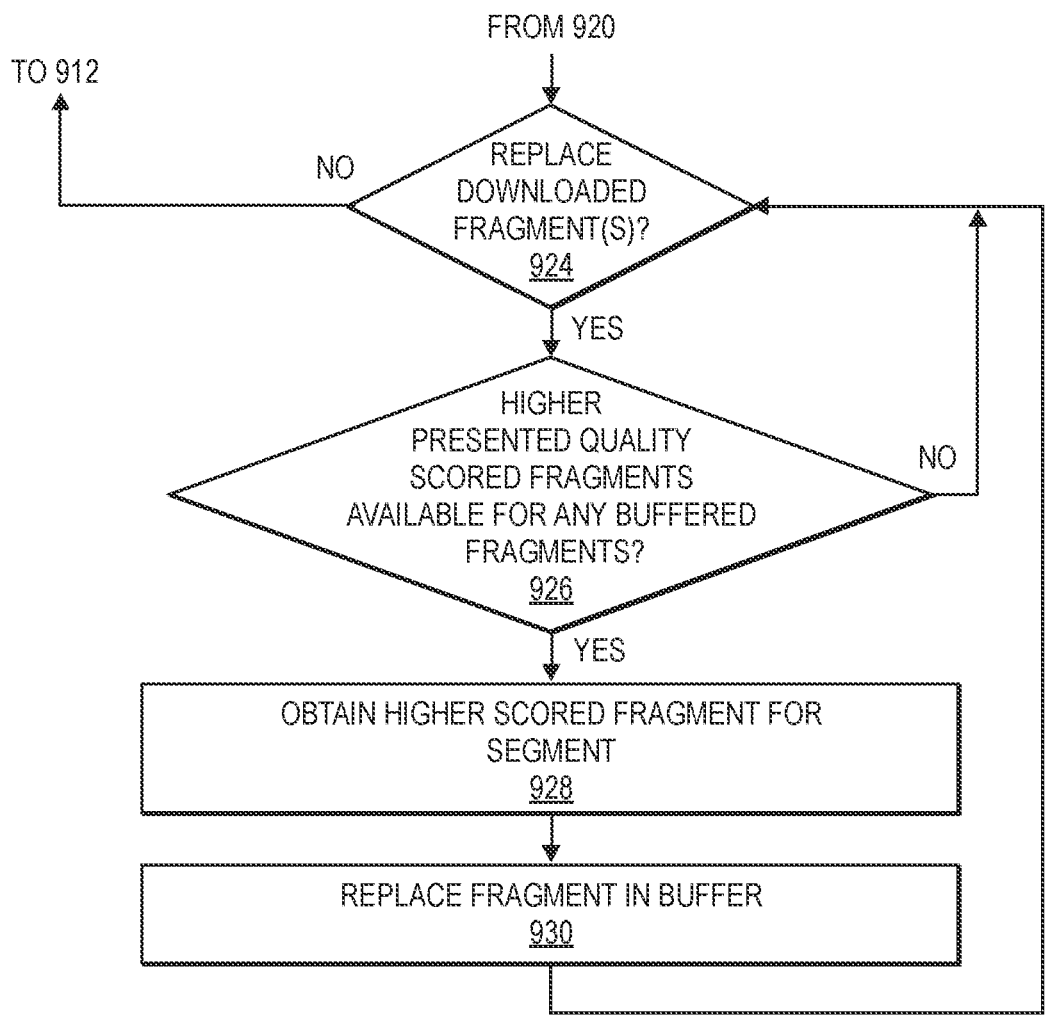

FIGS. 9A-9B are an example media streaming process 900, in accordance with disclosed implementations. The example process 900 may be performed by a device or an application executing on a device.

The example process 900 begins with the device, or an application executing on the device (generally referred to herein collectively as the device), requesting a media file, as in 902. For example, if a user of a device selects to stream a media file, such as a movie, podcast, audio file, etc., the device may send a request to the media server requesting the media file.

In response to sending the request for a media file, the device receives a manifest file for the media file, as in 904. As discussed above, the manifest file may include, among other information, an indication of available fragments for each segment of the media file, along with presented quality scores determined for each of those available fragments. In some implementations, as discussed above, the manifest file corresponding to the media file may be specific to the device type of the device that requested the media file. In such an example, when the device sends the request for the media file in block 902, the request may include an indication of the device type and/or information about the device that can be used to classify the device into a device type.

In some implementations, rather than receiving a manifest file, the device may receive a link or indicator of a remote storage location at which the manifest file and/or information that may be included in a manifest file corresponding to the media file is maintained, such as metadata, available fragments, and/or presented quality scores for available fragments. In still other examples, the device may be able to access a location that includes the manifest file or information that may be included in the manifest file for media file as part of the request for the media file.

In addition to receiving the manifest file or accessing a location that includes the manifest file or information that may be included in the manifest file, the device may determine an expected bandwidth that is available to the device via a network to which the device is connected and interacting with the media service, as in 906. Any of a variety of techniques may be used to determine expected bandwidth. For example, past bandwidth available to the device may be utilized as expected bandwidth, the device may ping another service and measure bandwidth, etc.

In addition, in some implementations, initial streaming quality may be determined, as in 905. Initial streaming quality may be determined based on one or more of an estimated time required to initiate presentation of the streaming media file (startup time), a presented quality for initial presentation of the media file, a risk of re-buffering of the media file, and/or based on one or more user preferences. Initial streaming quality may be based on a balance between each of these factors with higher initial quality requiring a longer startup time and/or higher risk of re-buffering. Likewise, these factors may be influenced by user indicated preferences. For example, a user may indicate that they are willing to wait a little longer (longer startup time) to receive a higher quality presentation. Likewise, while this example discusses initial presentation of the media file, the disclosed implementations are equally applicable to resuming presentation of the media file, initiating presentation at a point or location within a media file, etc.

A lowest bitrate fragment with the highest quality score that does not conflict with the expected bandwidth and determining initial streaming quality may be requested for each of one or more segments of the media file, as in 910. As indicated, in some implementations, different fragments encoded at different bitrates may be downloaded for different segments of the media file, yet the presentation of the media file will remain consistent because the fragments are selected based on presented quality scores determined for those fragments. Likewise, the example process 900 may consider multiple segments in determining which fragments to download for those segments. Such a determination may consider, for example, bitrates of each of the fragments of the different segments, the presented quality scores of the different fragments of the different segments, the size of the fragments, etc. In some implementations, a rate-distortion algorithm may be used to select fragments for each of a plurality of segments based at least in part on a balance between the size of the fragments and the presented quality scores determined for the fragments. In other implementations, other techniques may be utilized in addition to, or as an alternative to a rate-distortion algorithm to determine which fragment(s) to obtain for segments of a media file.

As fragments are received, the fragments may be stored in a buffer on the device and presented as the streaming media file through a presentation component (e.g., display) of the device, as in 912. As the received fragments are obtained, stored, and presented, actual parameters relating to the device, the media file, and/or streaming of the media file may be monitored, as in 914. Actual parameters may include, but are not limited to, actual bandwidth available to the device, actual presented quality of the fragments, whether re-buffering occurred, etc.

Based on the actual parameters, a determination may be made as to whether one or more of the presented quality scores need to be adjusted for any of the fragments indicated as available in the manifest file, as in 916. For example, if one or more estimated parameters, such as presented quality, do not correspond with measured actual parameters, it may be determined that the presented quality scores need to be adjusted so that the presented quality scores associated with fragments that are indicated as available in the manifest file correspond with how the fragments are actually being obtained and presented by the device.

If it is determined that one or more of the presented quality parameters are to be adjusted, the example adjust presented quality scores process 1000 may be performed. The example adjust presented quality scores process 1000 is discussed further below with respect to FIG. 10. If it is determined that the presented quality scores do not need to be adjusted or after adjusting the presented quality scores, the lowest bitrate fragments with the highest presented quality scores that correspond with the expected/actual bandwidth and/or other parameters are requested so that streaming of the media file may continue, as in 920.

Referring now to FIG. 9B, as additional fragments are obtained by the device, a determination is made as to whether any of the obtained/downloaded fragments that are maintained in the buffer memory are to be replaced, as in

924. As is known, a buffer memory may be defined to temporarily store an amount of fragments for a media file and fragments obtained from the buffer for streaming. Buffer sizes may vary for different devices, different media files, etc. In some implementations, the buffer may maintain approximately two minutes' worth of fragments when those fragments are presented. In other implementations, the buffer may contain additional or fewer fragments of a media file.

If it is determined that one or more of the fragments maintained in the buffer are not to be replaced, the example process may return to block 912 and continue. If it is determined that one or more of the fragments maintained in the buffer are to be replaced, a determination may be made as to whether higher presented quality scored fragments for a segment are available for any buffered fragments, as in 926. For example, the example process may not obtain a highest scored fragment for a segment due to expected bandwidth constraints. In such an example, if the actual bandwidth is higher than the expected bandwidth, the buffer may become full, and the example process may determine that a higher bandwidth fragment for the segment is available and can be obtained before a fragment for that segment is to be presented.

If it is determined that a higher presented quality scored fragment for a segment of the media file is available, a higher presented quality scored fragment for the segment is obtained, as in 928, and the lower presented quality scored fragment is replaced in the buffer, as in 930. In some implementations, the next highest presented quality score fragment may be obtained. In other examples, the fragment having the lowest bitrate with the highest quality score may be obtained. In still other examples, a determination comparing an estimated time required to obtain the higher presented quality scored fragments and an estimated time until a fragment is to be presented by performed and a highest presented quality scored fragment may be obtained that can be downloaded into the buffer before it needs to be presented.

After replacing a lower presented quality scored fragment with a higher presented quality scored fragment, as in 930, or if it is determined in decision block 926 that there are no higher presented quality scored fragments, the example process 900 returns to block 924 and continues.

The example process 900 may continue until the entire media file is streamed or otherwise terminated, for example by a user.

Figure 10:
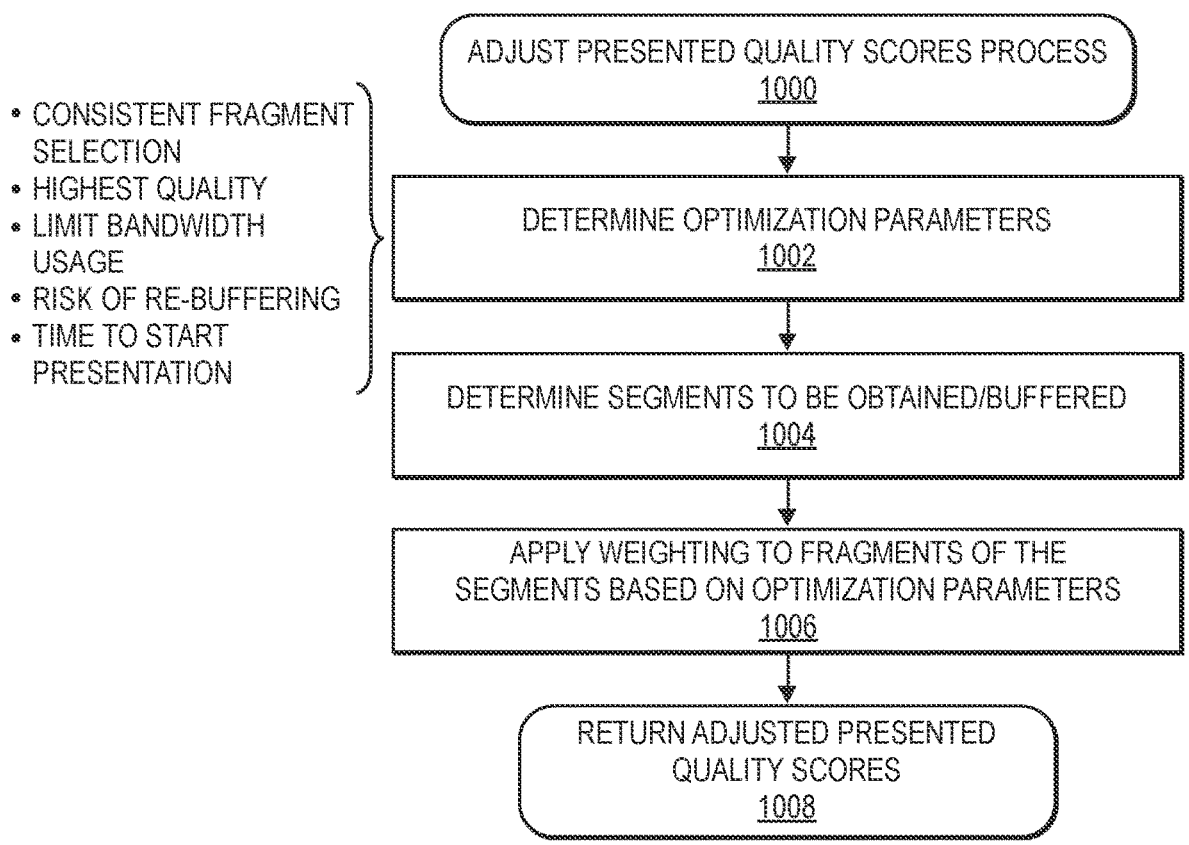
FIG. 10 is an example presented quality score adjustment process, in accordance with disclosed implementations.

FIG. 10 is an example presented quality score adjustment process 1000, in accordance with disclosed implementations. The example process 1000 may be performed as part of the example process 900 or at any other point in time for a media file, a download of a media file, or a streaming of a media file.

The example process 1000 begins by determining one or more optimization parameters, as in 1002. Optimization parameters may include, but are not limited to, consistent fragment selection, highest quality fragment presentation, limited bandwidth usage, etc. As will be appreciated, any of a variety of optimization parameters may be considered and presented quality scores for fragments indicated in a manifest file may be adjusted to account for those optimization parameters. Through use of the example process 1000, optimization may be realized on a device without impacting or having to modify presented quality scores determined by a DNN of different fragments. As a result, changes to account for different optimization parameters may be quickly performed on the device and adjusted as needed.

The example process 1000 may determine segments to be obtained/buffered for which the optimization parameters are to be applied, as in 1004. In some implementations, the optimization parameters may be applied to all segments of a media file that are to be obtained/buffered. In other implementations, optimization parameters may be applied to a subset of the segments of the media file, for example, the next set of segments to be downloaded and maintained in a buffer of the device.

For the determined segments, one or more weights may be applied to the presented quality scores of the indicated available fragments corresponding to the segments for which the optimization parameters are to be applied, as in 1006. For example, if the optimization parameter is to limit or reduce the amount of bandwidth to be used to stream the media file, a weighting may be applied to each presented quality score for each fragment of the segments for which the optimization parameter is to be applied such that the presented quality score for lower bitrate segments is increased. Accordingly, when the example process 1000 selects a highest presented quality scored fragment the adjusted presented quality scores will increase a likelihood that the example process 1000 will select a fragment with a lower bitrate, thereby reducing the overall amount of bandwidth required to download the fragment.

Finally, the adjusted presented quality scores for each fragment of the segment(s) for which the presented quality scores are to be adjusted are returned, as in 1008.

Figure 11A:
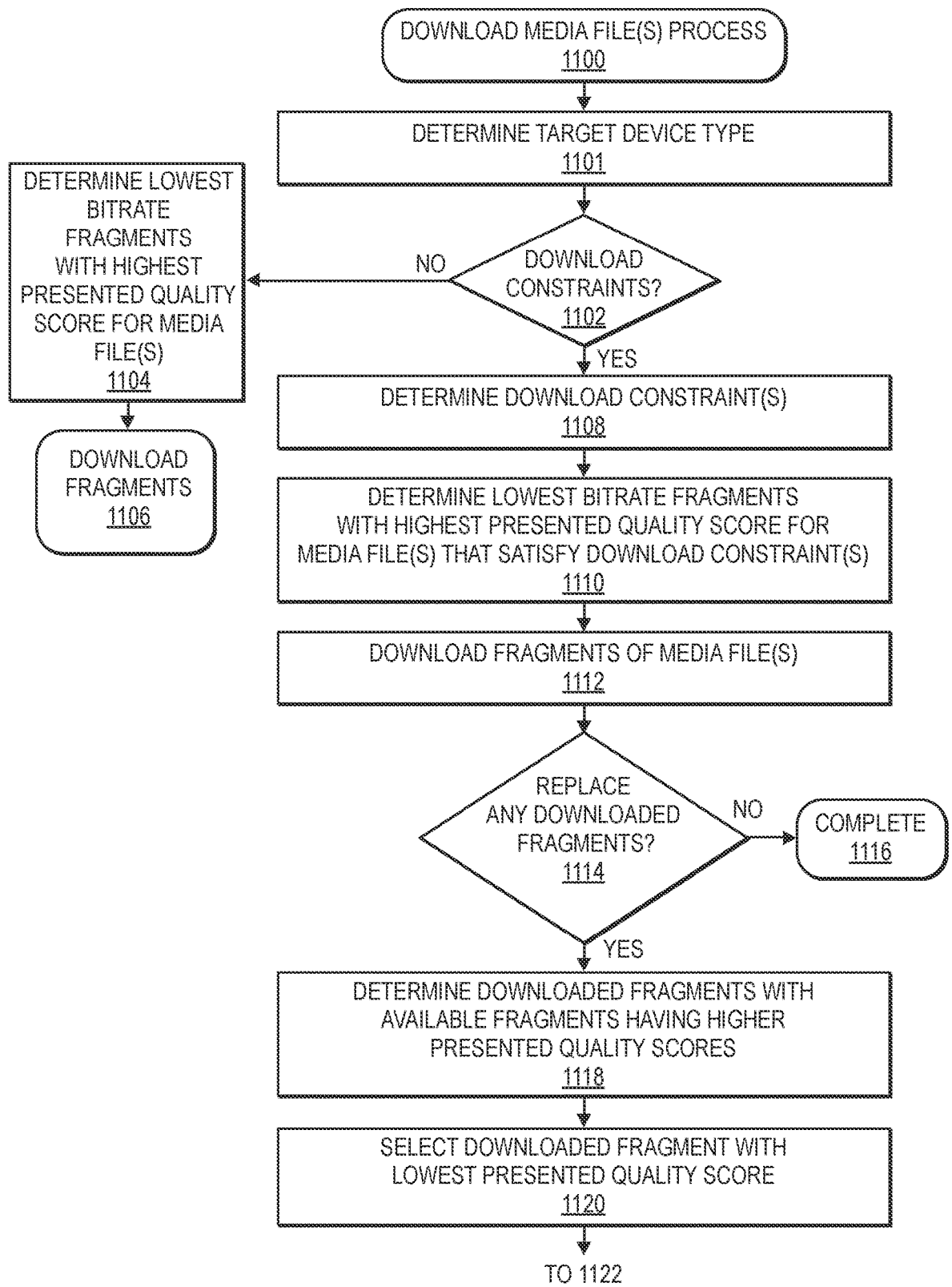
FIGS. 11A-11B are an example media file download process, in accordance with disclosed implementations.
Figure 11B:
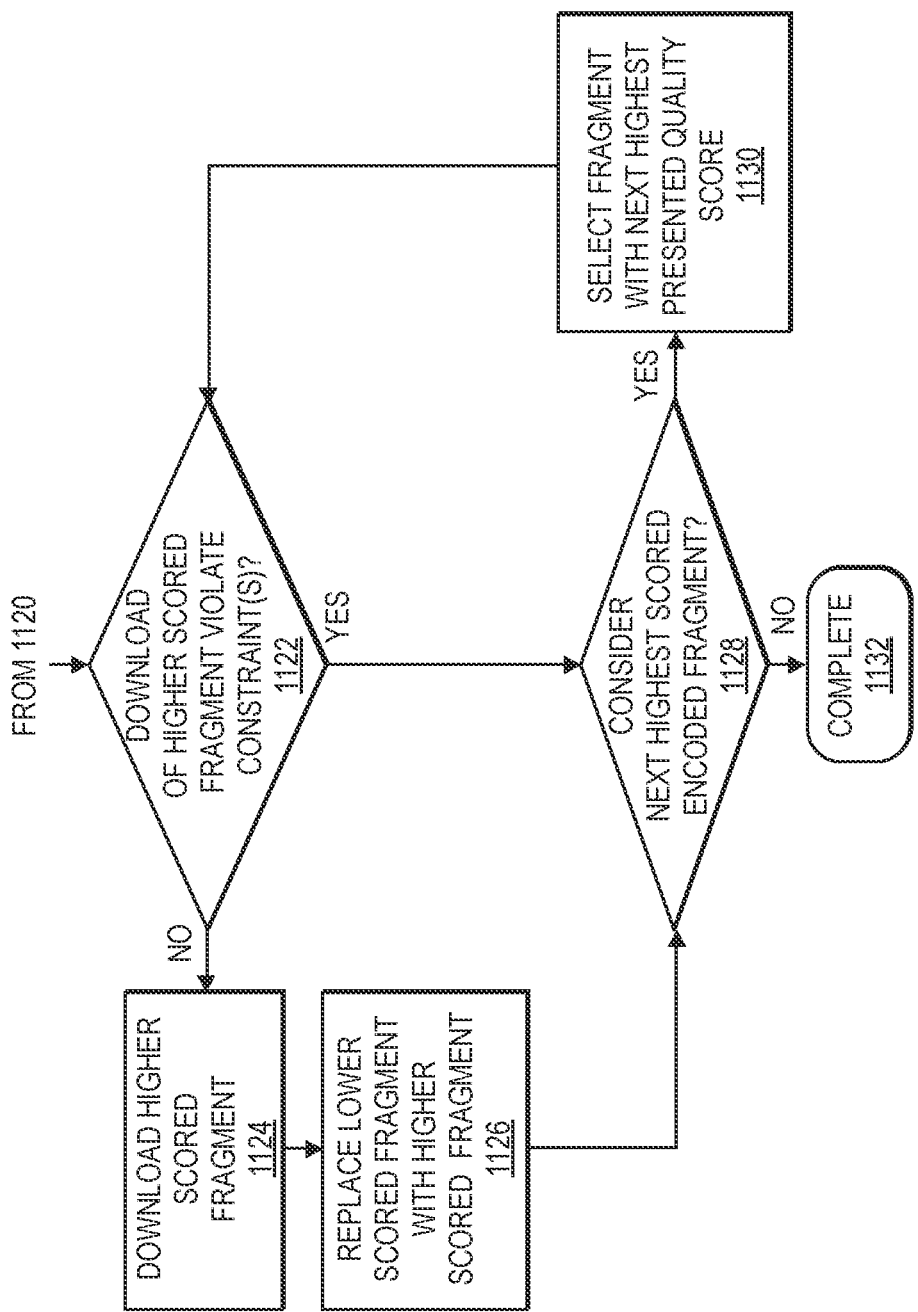

FIGS. 11A-11B are an example media file download process 1100, in accordance with disclosed implementations. The example process 1100 may be performed by a device or an application executing on the device any time one or more media files of the same or different types are to be downloaded to a device.

The example process 1100 begins by determining a target device type for which the media file(s) are being obtained, as in 1101. In some implementations, the target device may be the device that is downloading the media file(s). In other examples, the target device may be a different device type than the device type of the device that is downloading the media file(s). For example, if the device that is downloading the media file(s) is a laptop, it may be determined, for example based on user provided information or history, that the target device is of a different device type (e.g., 4k television) that will be connected to the laptop.

A determination may also be made as to whether there are one or more download constraints to consider as part of the download of the one or more media files, as in 1102. Download constraints may include any of a variety of constraints. For example, download constraints may include a total amount of time available to complete the download of the one or more media files, an expected bandwidth available for download of the one or more media files, an amount of available memory on the device for storage of the downloaded one or more media files, etc.

If it is determined that there are no download constraints, the lowest bitrate fragment having a highest presented quality score for each segment of the media file(s) are determined, as in 1104. Determination of the lowest bitrate fragment having a highest presented quality score is discussed above and may be indicated in a manifest file corresponding to each of the one or more media files to be downloaded. In some implementations, again as discussed above, the media files and thus the corresponding lowest bitrate fragment having a highest presented quality score for each segment may be specific to particular device types, such as the determined target device type. The determined fragments for each segment of the one or more media files may then be downloaded and stored in a memory of the device, as in 1106.

If it is determined at decision block 1102 that one or more download constraints exist, the download constraint(s) for the download are determined, as in 1108. In some implementations, one or more of the download constraints may be determined by the example process 1100. In other implementations, one or more of the download constraints may be indicated by a user requesting to perform the download. For example, if the user is at an airport and wanting to download one or more media files to watch during a flight, the user may indicate a download constraint of an amount of time the user has for the download to complete before the user must board the flight. Likewise, the example process may determine a second constraint regarding an available bandwidth available to the device to complete the requested download.

Based on the download constraints and the media files to be downloaded, a lowest bitrate fragment having a highest presented quality score for each segment of each media file may be determined such that the collective of each of determined encoded media files satisfy the constraint(s) determined for the download, as in 1110. As discussed above, the fragments determined for each segment of each media file may be determined from a manifest file generated for each media file, in accordance with the disclosed implementations.

Continuing with the above example, if the user indicates two media files for download before the user boards the flight in thirty minutes, the examples process may determine the collective fragments for each of the two media files that will result in the highest presented quality scores for each segment of the media files while still having sufficient time to download both media files. In some implementations, this collective determination may result in different file sizes and/or different bitrate encodings for the different media files and/or segments of the media files. As discussed above, this variation in file size and/or different bitrate encodings is available through the presented quality score determined for each fragment of each segment of the media files such that different bitrate fragments may be selected without disrupting the presentation of the media file to the user.

Upon determination of the fragments to download for each of the one or more media files, considering the constraints, the fragments are downloaded and stored in a memory of the device, as in 1112.

Upon completion of the download of each of the fragments of the media files, a determination may be made as to whether any of the downloaded and stored fragments are to be replaced, as in 1114. For example, if download is completed within the constraints such that additional time remains to continue downloading other fragments, it may be determined that one or more downloaded fragments may be replaced.

If it is determined that no downloaded fragments are to be replaced, the example process 1100 may complete, as in 1116. If it is determined that one or more downloaded fragments may be replaced, the example process 1100 determines downloaded segments that include fragments indicated in the corresponding manifest file for the media file that are available for download that have a higher presented quality score than the fragment of the segment that is already downloaded, as in 1118.

A segment having a downloaded fragment with a lowest presented quality score is then selected, as in 1120. Turning to FIG. 11B, for the selected downloaded fragment, a determination is made as to whether download of the higher presented quality score fragment for the segment violates the one or more constraints for the download, as in 1122. If it is determined that the download does not violate one or more of the constraints, the higher presented quality scored fragment is downloaded, as in 1124, and used to replace the lower presented quality scored fragment of the segment, as in 1126.

If it is determined that the download will violate one or more of the constraints or after downloading the higher presented quality scored fragment, a determination is made as to whether a next highest presented quality scored fragment should be considered for download, as in 1128. If it is determined that a next highest presented quality scored fragment for the segment is not to be considered for download, the example process 1100 completes, as in 1132. However, if it is determined that the next highest presented quality scored fragment is to be considered for download, the fragment of the segment having the next highest presented quality score is selected, as in 1130, and the example process 1100 returns to decision block 1122 and continues with the selected next highest presented quality scored fragment.

Figure 12:
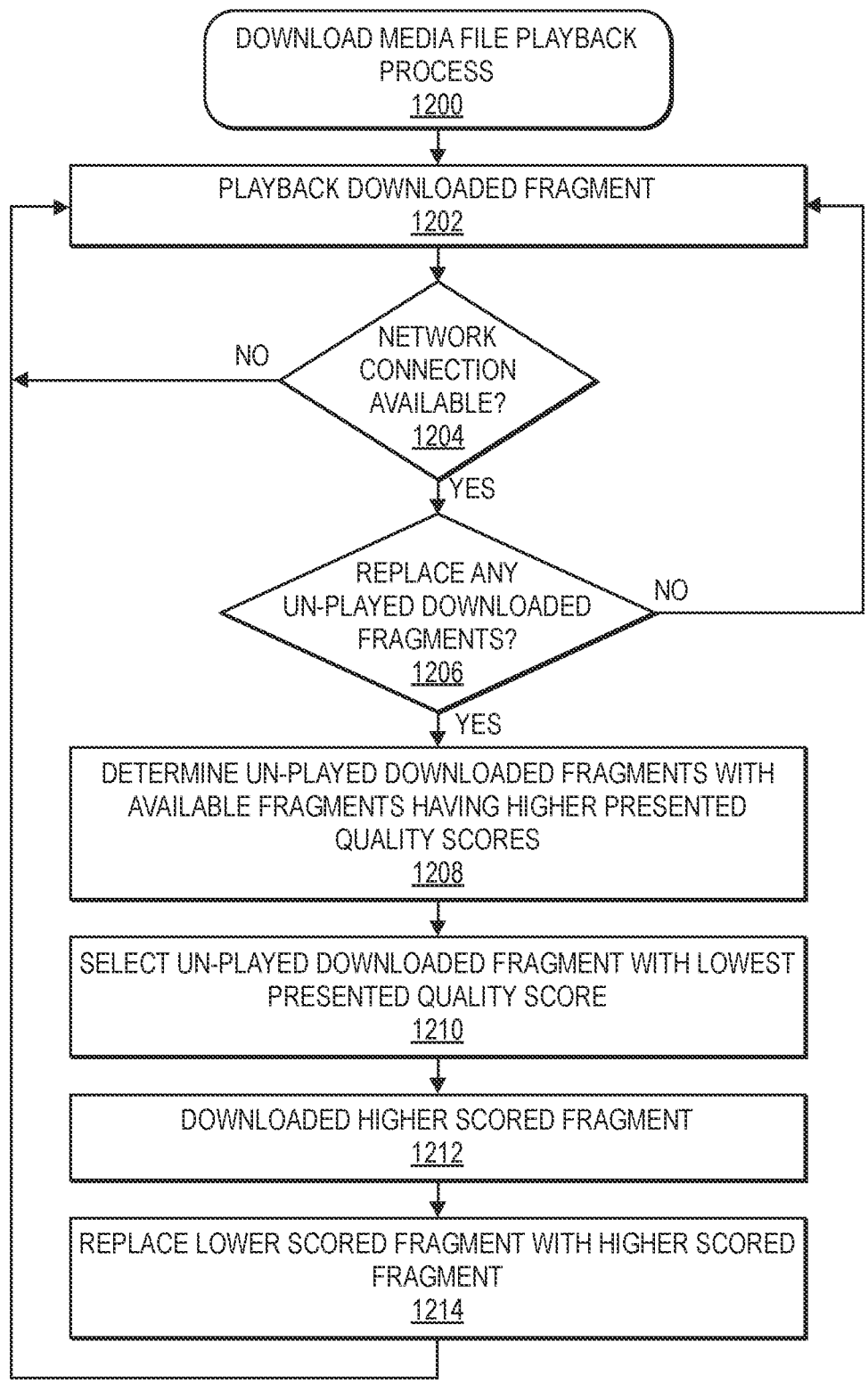
FIG. 12 is an example downloaded media file playback process, in accordance with disclosed implementations.

FIG. 12 is an example downloaded media file playback process 1200, in accordance with disclosed implementations.

The example process 1200 begins when playback of one or more fragments of a downloaded media begins, as in 1201. As fragments of a media file are presented, a determination is made as to whether a network connection is available to the device that is storing the media file that is being presented, as in 1204. If no network connection is available to the device, the example process 1200 returns to block 1202 and continues.

If a network connection is available, a determination may be made as to whether one or more un-played downloaded fragments of the media should be replaced, as in 1206. For example, the example process may determine if there are available fragments for a segment of the media file indicated in the manifest file that have a higher presented quality score than a downloaded fragment for the same segment. If an available media file with a higher presented quality score is available, it may be determined that a downloaded un-played fragment is to be replaced. In comparison, if it is determined that there are no fragments with higher presented quality scores beyond the fragments already downloaded, it may be determined that none of the downloaded and un-played fragments are to be replaced.

If it is determined that no fragments are to be presented, the example process 1200 may return to block 1202 and continue. If it is determined that one or more downloaded and un-played fragments may be replaced, the example process 1200 determines downloaded segments that include fragments indicated in the corresponding manifest file for the media file that are available for download that have a higher presented quality score than the fragment of the segment that is already downloaded, as in 1208.

A segment having a downloaded fragment with a lowest presented quality score is then selected, as in 1210, an available higher presented quality scored fragment is downloaded, as in 1212, and used to replace the lower presented quality scored fragment of the segment, as in 1214. In some implementations, rather than just replacing the lowest presented quality scored fragment, a determination may be made as to whether any constraints exist for the media file or the device (e.g., available store, bandwidth usage, etc.). In such an example, the example process 1200 may consider the constraint and all downloaded fragments for which higher presented quality scored fragments exist and select, for each of those fragments, the highest quality scored fragments that can all be downloaded and/or presented without violating the determined constraint. For example, if the constraint is total available storage on the device, rather than just downloading the highest presented quality scored fragment to replace a lowest presented quality scored fragment that is already downloaded, the example process may determine which higher quality scored fragments can be downloaded for each fragment of the media file that is to be replaced and select a combination of fragments that can be downloaded without violating the constraint. By considering each of the fragments of a media file together, the overall updating of the media file and thus the overall resulting presented quality of the media file as a whole is improved.

After replacing the fragment with the lower presented quality score, the example process 1200 may return to block 1202 and continue.

The example process 1200 may continue throughout presentation of the media file until it is determined that no un-played downloaded fragments are to be considered for replacement. In some implementations, if it is determined that there are no un-played fragments to be considered for replacement, the example process 1200 may also determine if there are any segments of the media file that have already been presented that have available higher quality scored fragments than the fragment that was downloaded and stored. For example, if it is determined that the media file may be played back multiple times (e.g., it was purchased) the example process may determine that download and replacement of fragments with higher presented quality scored fragments should be performed if there is a network connection, even if those fragments have already been presented.

Still further, in some examples, the example process may be performed even if the media file is not being presented. For example, the media service executing on a device upon which downloaded content is stored, may periodically check to determine if a network connection is available. If a network connection is available, the example process 1200 may be performed for some or all segments of some or all downloaded media files stored on that device, replacing stored fragments of a segment with fragments that have higher presented quality scores.

Figure 13A:
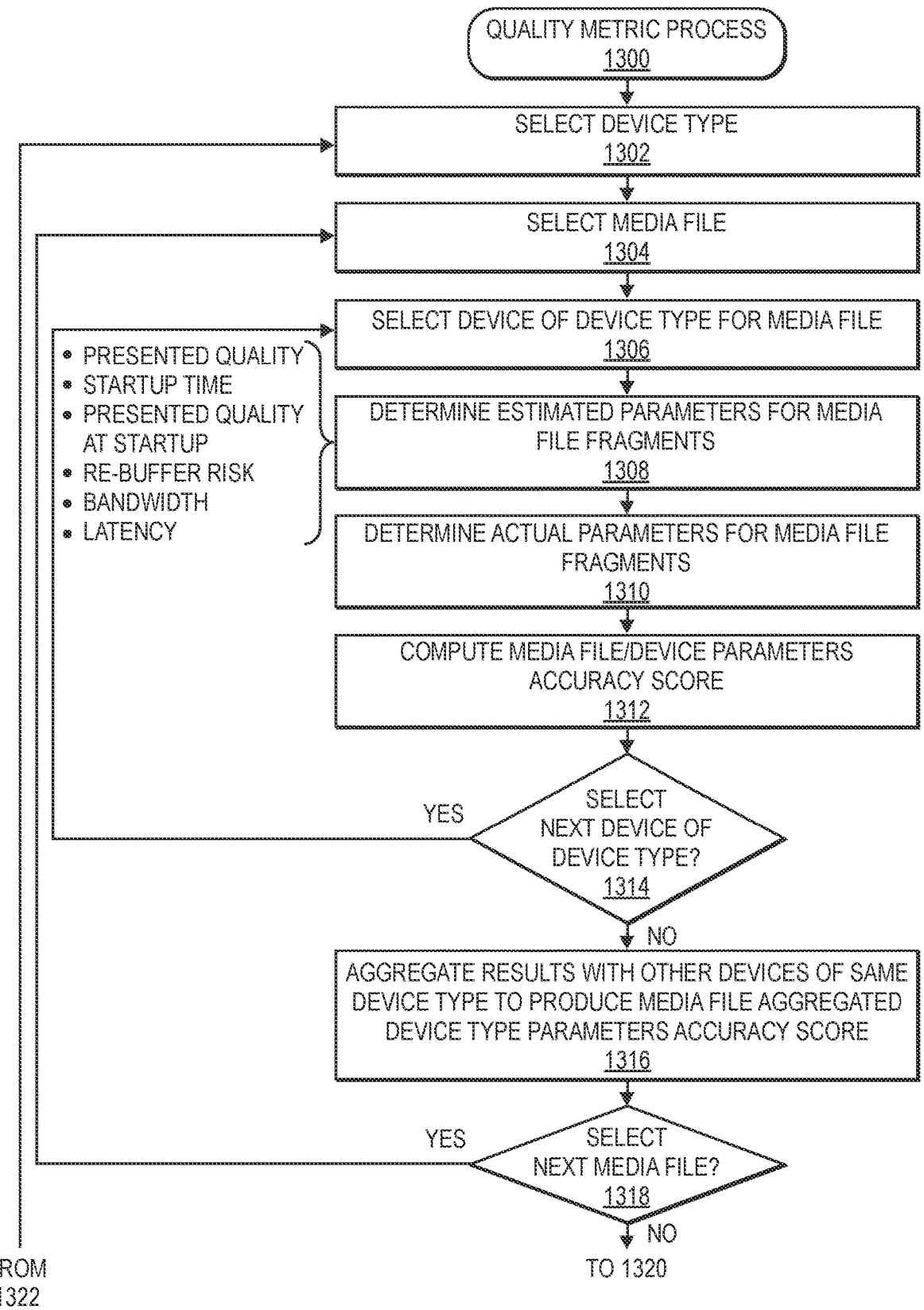
FIGS. 13A-13B are an example quality metric process, in accordance with disclosed implementations.
Figure 13B:
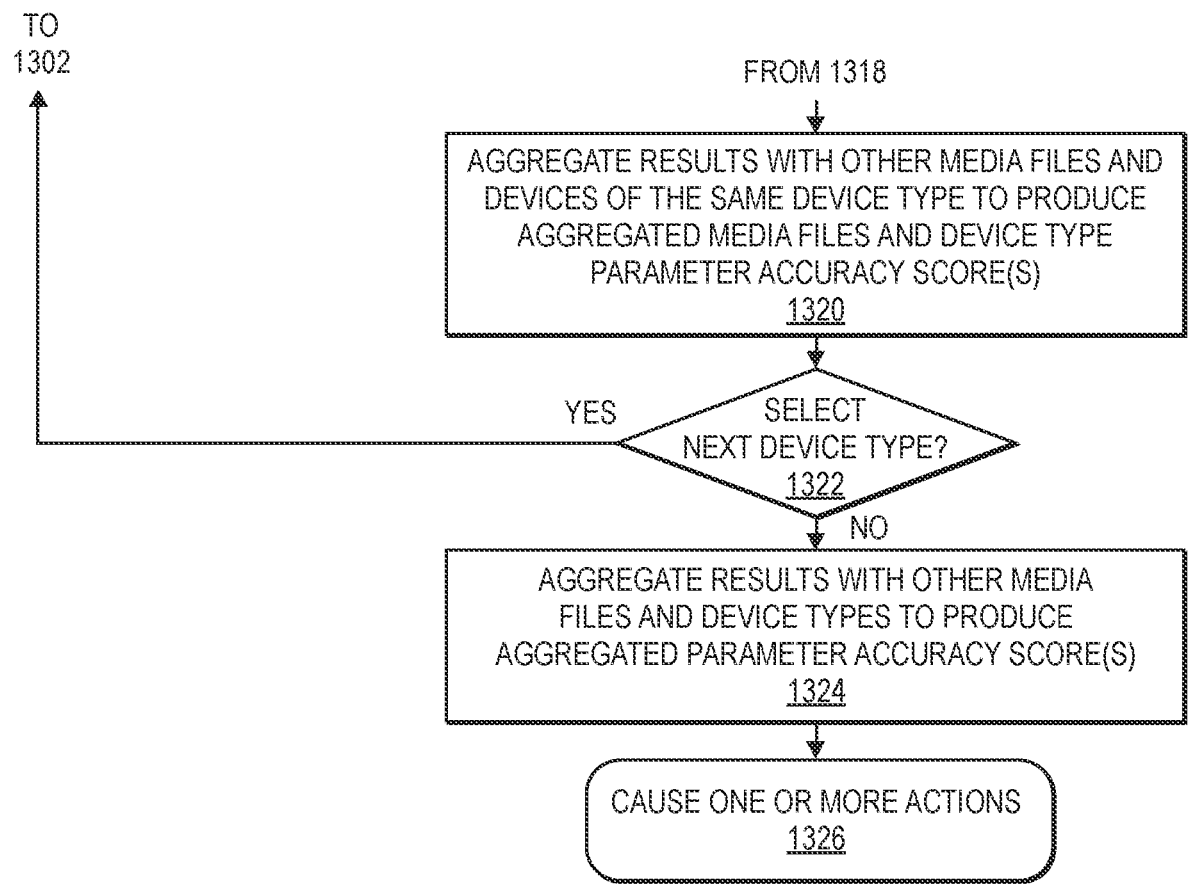

FIGS. 13A-13B are an example quality metrics process 1300, in accordance with disclosed implementations. The example quality metrics process 1300 may be performed periodically, with each streaming or download of a media file, etc.

Referring first to FIG. 13A, the example process 1300 begins by selecting a device type for which the example quality metrics process is to be performed, as in 1302. As noted above, in some implementations, devices may be classified into one of a plurality of device types for which presented quality scores may be determined for different fragments. In addition to selecting the device type, a media file may be selected for which the example process is to be performed as in 1304. Finally, for the selected device type and media file, a particular device from the device type that obtained the media file may be selected, as in 1306.

For each segment of the selected media file and device, one or more estimated parameters corresponding to the device and the selected media file are determined, as in 1308. Estimated parameters may include, but are not limited to, an estimated quality of the media file when presented by the selected device, an estimated startup time required to initiate streaming of the media file by the device, an estimated initial presented quality of the media file when presented by the device, an estimated bandwidth available to the device, an estimated network latency, etc.

In addition to determining/obtaining estimated parameters, actual parameters corresponding to the estimated parameters may likewise be determined for the media file and device, as in 1310. For example, if the estimated parameters include an estimated quality of the media file when presented by the selected device, an estimated startup time required to initiate streaming of the media file by the device, an estimated initial presented quality of the media file when presented by the device, an estimated bandwidth available to the device, and an estimated network latency are determined at block 1308, actual parameters corresponding to the estimated parameters and experienced by the device while obtaining the media file may likewise be determined as in 1310. For example, actual parameters of actual quality of the media file when presented by the selected device, an actual startup time required to initiate or re-initiate streaming of the media file by the device, an actual initial/resumed presented quality of the media file when presented by the device, an actual bandwidth available to the device, an actual network latency, whether re-buffering occurred during presentation, etc., may be collected and/or monitored for media files and/or devices.

In addition to determining estimated parameters and actual parameters, a media file/device parameters accuracy score may then be computed for each of the parameters based on a comparison of the estimated parameters and the actual parameters, as in 1312. For example, a difference, ratio, etc., between the estimated parameter and corresponding actual parameters for the media file/device may be computed and utilized as a media file/device parameter accuracy score.

The example process may then determine if a next device of the device type that accessed or otherwise obtained the media is to be selected and processed by the example process 1300, as in 1314. If it is determined that a next device of the device type is to be selected, the example process 1300 returns to block 1306, selects a next device of the device type and continues. If it is determined that a next device of the device type is not to be selected and processed by the example process 1300, media file/device parameter accuracy scores determined for the device may be aggregated with other devices of the device type that accessed the media file to produce media file aggregated device type parameters accuracy scores for the parameters, as in 1316. For example, each parameter accuracy score determined for each device of the device type that accessed the media file may be combined (e.g., summed, averaged, etc.), to produce a media file aggregated device type parameter accuracy score.

After producing one or more media file aggregated device type parameter accuracy scores, a determination may be made as to whether a next media file is to be selected and processed by the example process 1300, as in 1318. If it is determined that a next media file is to be selected and processed, the example process 1300 returns to block 1304, selects a next media file, and continues.

Turning now to FIG. 13B, if it is determined that a next media file is not to be selected for processing by the example process 1300, results determined by the example process 1300 may be aggregated with results from other media files processed by the example process 1300 for the same device type to produce one or more aggregated media files and device type parameter accuracy scores, as in 1320. For example, the media file aggregated device type parameter scores determined for different media files processed by the example process 1300 for the same device type may be combined (e.g., summed, averaged, etc.), to produce the one or more aggregated media file and device type parameter accuracy scores.

Finally, a determination may be made as to whether a next device type is to be selected for processing by the example process 1300, as in 1322. If it is determined that a next device type is to be processed by the example process 1300, the example process 1300 returns to block 1302 (FIG. 13A), selects a next device type and continues. If it is determined that a next device type is not to be selected, the example process 1300 may aggregate the results with parameter accuracy results determined for other media files and other devices of other device types to produce aggregated parameter accuracy scores for the media service as a whole, as in 1324.

Based on the parameter accuracy scores, estimated parameters, and/or the actual parameters, one or more actions may be performed or caused to be performed, as in 1326. For example, actions that are caused to be performed may include, but are not limited to, altering a presented quality score for one or more of the plurality of fragments, altering a bandwidth availability corresponding to a device, updating a device history for a device, retraining a machine learning model that generates presented accuracy scores for devices of the device type, generating or replacing fragments of the media file, adjusting an indication of available fragments of the media file in one or more manifest files, adjusting what fragments to store and make accessible to devices (e.g., what fragments to store on edge nodes of a content delivery network), determining issues or problems with networks, data stores, delivery networks, etc., adjusting device players that obtain and present the media files, etc. In some implementations, the actual parameters and/or parameter accuracy scores may also be used to identify potentially faulty media services or devices.

Figure 14:
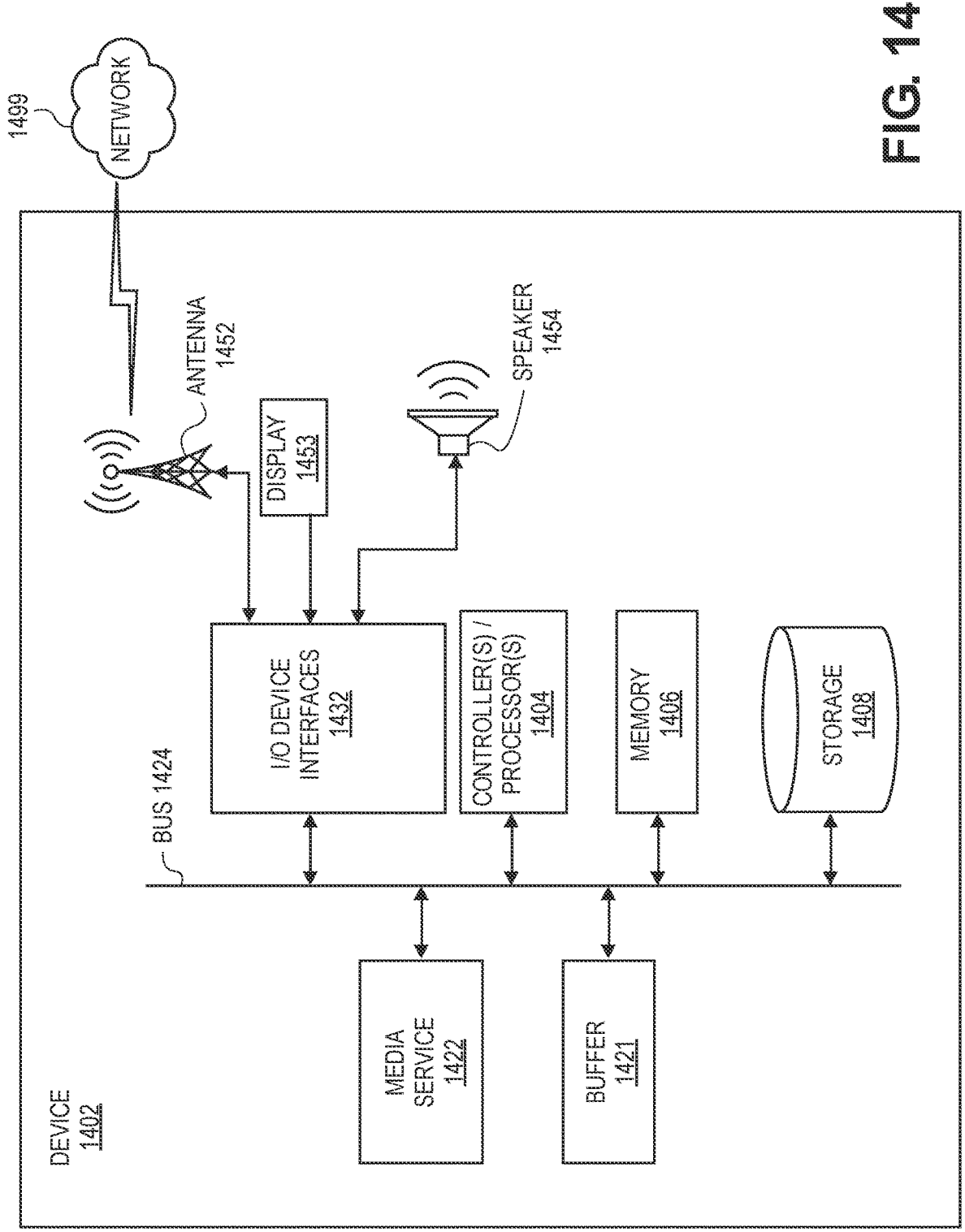
FIG. 14 illustrates example components of a device, in accordance with described implementations.
Figure 15:
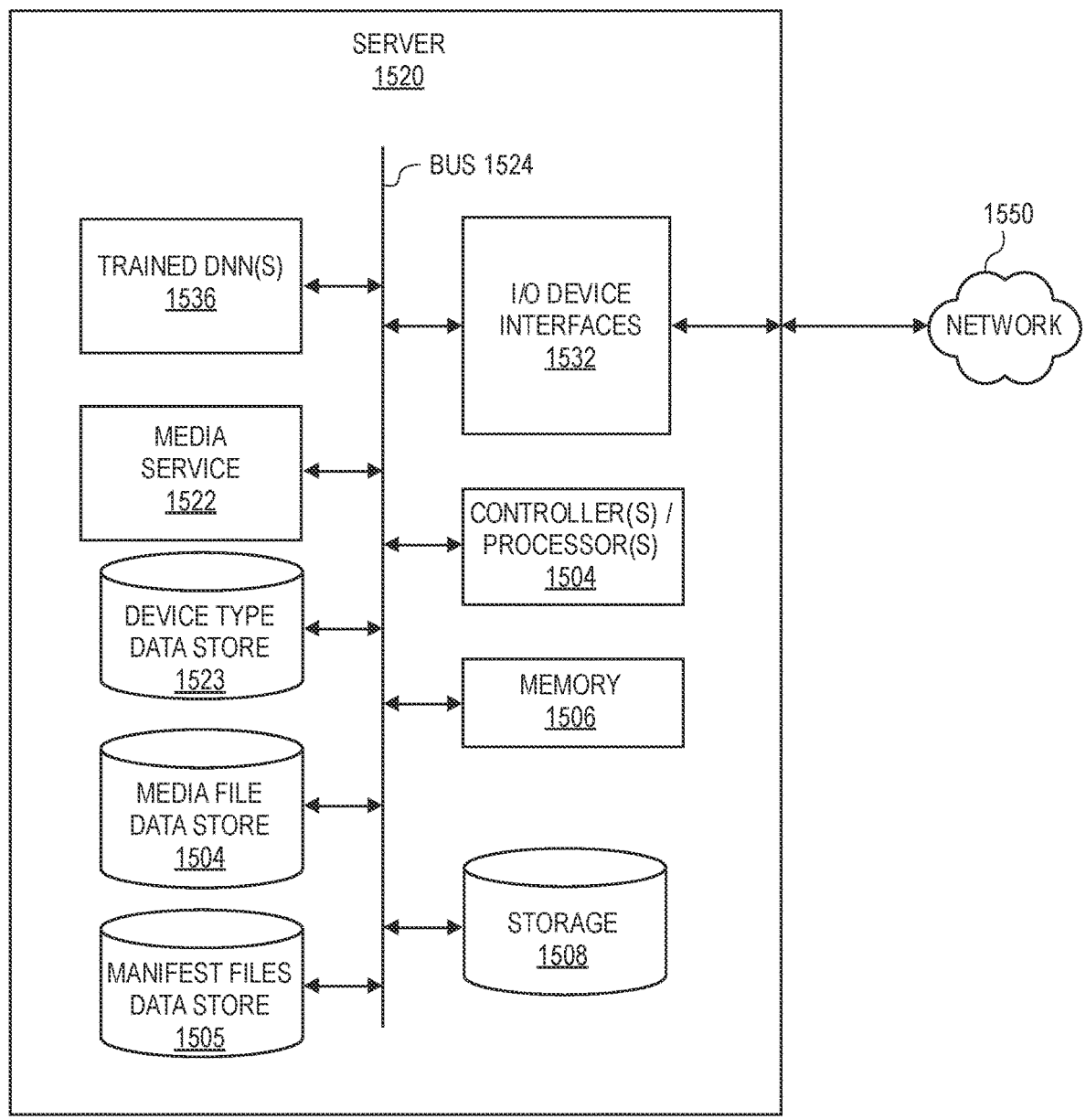
FIG. 15 illustrates example components of a server, in accordance with described implementations.

FIG. 14 is a block diagram conceptually illustrating a device 1402 that may be used with the described implementations. FIG. 15 is a block diagram conceptually illustrating example components of a remote computing device, such as a remote server 1520 that may include one or more trained DNNs 1536 as discussed herein and/or include the media service 1522. Multiple such servers 1520 and/or DNNs 1536 may be included in the system. In operation, each of these devices (or groups of devices) may include computer-readable and computer-executable instructions that reside on the respective device (1402/1520), as will be discussed further below.

Each of these devices (1402/1520) may include one or more controllers/processors (1404/1504), that may each include a central processing unit (CPU) for processing data and computer-readable instructions, and a memory (1406/1506) for storing data and instructions of the respective device. The memories (1406/1506) may individually include volatile random-access memory (RAM), non-volatile read only memory (ROM), non-volatile magnetoresistive random-access memory (MRAM) and/or other types of memory. Each device may also include a data storage component (1408/1508), for storing data, controller/processor-executable instructions, etc. Likewise, the server 1520 may include or be operable to access a device type data store 1523, a media file data store 1504, and/or a manifest file data store 1505. Each data storage component and/or data store may individually include one or more non-volatile storage types such as magnetic storage, optical storage, solid-state storage, etc. Each device may also be connected to removable or external non-volatile memory and/or storage (such as a removable memory card, memory key drive, networked storage, etc.) through respective input/output device interfaces (1432/1532).

Computer instructions for operating each device (1402/1520) and its various components may be executed by the respective device's controller(s)/processor(s) (1404/1504), using the memory (1406/1506) as temporary "working" storage at runtime. A device's computer instructions may be stored in a non-transitory manner in non-volatile memory (1406/1506), storage (1408/1508), or an external device(s). Alternatively, some or all of the executable instructions may be embedded in hardware or firmware on the respective device in addition to or instead of software.

Each device (1402/1520) includes input/output device interfaces (1432/1532). A variety of components may be connected through the input/output device interfaces. Additionally, each device (1402/1520) may include an address/data bus (1424/1524) for conveying data among components of the respective device. Each component within a device (1402/1520) may also be directly connected to other components in addition to (or instead of) being connected to other components across the bus (1424/1524).

Referring to the device 1402 of FIG. 14, the device 1402 may include a display 1453, one or more speakers 1454, and/or other input/output components. For example, the included input/output device interfaces 1432 that connect to a variety of components such as an audio output component such as the speaker 1454, a wired headset or a wireless headset, and/or other components capable of outputting audio. The device 1402 may also include an audio capture component. The audio capture component may be, for example, a microphone or array of microphones, a wired headset, or a wireless headset, etc.

The device may also include a communication interface, such as an antenna 1452. Any form of wired and/or wireless communication may be utilized to facilitate communication between the device 1402 and other devices. For example, any one or more of 802.15.4 (ZIGBEE), 802.11 (WI-FI), 802.16 (WiMAX), BLUETOOTH, Z-WAVE, near field communication ("NFC"), cellular, CAT6, etc., may be used to enable communication to and from the device 1402. For example, via the antenna(s), the input/output device interfaces 1432 may connect to one or more networks 1499/1550 via a wireless local area network (WLAN), (such as Wi-Fi) radio, Bluetooth, and/or wireless network radio, such as a radio capable of communication with a wireless communication network, such as a Long-Term Evolution (LTE) network, WiMAX network, 5G network, etc. A wired connection such as Ethernet may also be supported.

The server may also include a DNN 1536. As discussed above, the DNN 1536 may be trained to process fragments, device types, and/or bitrates to determine presented quality scores for the different fragments. Likewise, the device/server (1402/1520) may include a media service (1422/1522) that performs different aspects of the disclosed implementations. The device 1402 may also include a buffer memory 1421 that is used by the media service 1422 to store received fragments, as discussed herein.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers, communications, media files, and machine learning should recognize that components and process steps described herein may be interchangeable with other components or steps, or combinations of components or steps, and still achieve the benefits and advantages of the present disclosure. Moreover, it should be apparent to one skilled in the art that the disclosure may be practiced without some, or all of the specific details and steps disclosed herein.

Moreover, with respect to the one or more methods or processes of the present disclosure shown or described herein, including but not limited to the flow charts shown in FIGS. 2 through 6 and 9A through 13B, orders in which such methods or processes are presented are not intended to be construed as any limitation on the claims, and any number of the method or process steps or boxes described herein can be combined in any order and/or in parallel to implement the methods or processes described herein. In addition, some process steps or boxes may be optional. Also, the drawings herein are not drawn to scale.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk, and/or other media. In addition, components of one or more of the modules and engines may be implemented in firmware or hardware.

Disjunctive language such as the phrase "at least one of X, Y, or Z," or "at least one of X, Y and Z," unless specifically stated otherwise, is otherwise understood with the context as used in general to present that an item, term, etc., may be any of X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" or "a device operable to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

Although the invention has been described and illustrated with respect to illustrative implementations thereof, the foregoing and various other additions and omissions may be made therein and thereto without departing from the spirit and scope of the present disclosure.

What is claimed is:

1. A computer-implemented method, comprising:
   determining, for each fragment of a first plurality of fragments of a first media file that were downloaded by a first device, a first plurality of estimated parameters determined for the download of each of the first plurality of fragments to the first device, wherein at least some of the first plurality of estimated parameters are determined based at least in part on first presented quality scores determined for each fragment of the first plurality of fragments, wherein the first presented quality scores are indicative of a first predicted quality of the fragment of the first plurality of fragments when presented by the first device;
   determining, for each of the first plurality of fragments of the first media file, a first plurality of actual parameters for delivery or presentation of each of the first plurality of fragments of the first media file to the first device;
   computing, based at least in part on the first plurality of estimated parameters and the first plurality of actual parameters, a first plurality of parameter accuracy scores corresponding to the first media file and the first device;
   determining, for each fragment of a second plurality of fragments of a second media file that were downloaded by a second device, a second plurality of estimated parameters determined for the download of each of the second plurality of fragments to the second device, wherein at least some of the second plurality of estimated parameters are determined based at least in part on second presented quality scores determined for each fragment of the second plurality of fragments, wherein the second presented quality scores are indicative of a second predicted quality of the fragment of the second plurality of fragments when presented by the second device, wherein the second media file is different than the first media file;
   determining, for each of the second plurality of fragments of the second media file, a second plurality of actual parameters for delivery or presentation of each of the second plurality of fragments of the second media file to the second device;
   computing, based at least in part on the second plurality of estimated parameters and the second plurality of actual parameters, a second plurality of parameter accuracy scores corresponding to the second media file and the second device;
   aggregating the first plurality of parameter accuracy scores determined for the first media file and the first device and the second plurality of parameter accuracy scores determined for the second media file and the second device to produce a plurality of aggregated media files and device type parameter accuracy scores; and causing one or more actions based at least in part on one or more of the first plurality of parameter accuracy scores, the second plurality of parameter accuracy scores, or the plurality of aggregated media files and first device type parameter accuracy scores.

2. The computer-implemented method of claim 1, wherein the first presented quality scores are based at least in part on a device type of the first device.

3. The computer-implemented method of claim 1, wherein the first plurality of estimated parameters include one or more of a first presented quality, a time delay before starting a streaming of the first media file at the first device, an initial streaming quality at the first device, a presented quality at a start of the streaming of the first media file at the first device, a re-buffering risk for the first media file at the first device, an estimated bandwidth available to the first device, or a latency.

4. The computer-implemented method of claim 1, wherein the one or more actions include one or more of, altering a presented quality score for one or more of the first plurality of fragments, altering a bandwidth availability corresponding to the first device, updating a device history of the first device, retraining a machine learning model that generates presented accuracy scores for a device type of the first device, replacing a fragment of the first media file, generating an additional fragment for the first media file, adjusting an indication of available fragments of the first media file, adjusting what fragments to store and make accessible to devices of a first device type, determining an issue with a network, determining an issue with a data store, determining an issue with a delivery network, or adjusting a device player.

5. The computer-implemented method of claim 1, wherein the first device and the second device are of a first device type.

6. The computer-implemented method of claim 5, further comprising:

aggregating at least one of the first plurality of parameter accuracy scores and the second plurality of parameter accuracy scores with a third plurality of parameter accuracy scores determined for devices of a second device type to produce aggregated parameter accuracy scores, wherein the first device type is different than the second device type.

7. A computing system comprising:
one or more processors; and
a memory storing program instructions that, when executed by the one or more processors, further cause the one or more processors to at least:
determine a first plurality of estimated parameters for a first media file sent to a first device, wherein at least some of the first plurality of estimated parameters are determined based at least in part on one or more first presented quality scores determined for the first media file, wherein each of the first one or more presented quality scores are indicative of a first predicted quality of at least a portion of the first media file when presented by the first device;
determine, for the first media file, a first plurality of actual parameters for delivery of at least a portion of the first media file to the first device;
compute, based at least in part on the first plurality of estimated parameters and the first plurality of actual parameters, a first parameter accuracy score corresponding to the first media file and the first device;
determine a second plurality of estimated parameters for a second media file sent to a second device, wherein at least some of the second plurality of estimated parameters are determined based at least in part on one or more second presented quality scores determined for the second media file, wherein each of the second one or more presented quality scores are indicative of a second predicted quality of at least a portion of the second media file when presented by the second device, wherein the second media file is different than the first media file;
determine, for the second media file, a second plurality of actual parameters for delivery of at least a portion of the second media file to the second device;
compute, based at least in part on the second plurality of estimated parameters and the second plurality of actual parameters, a second parameter accuracy score corresponding to the second media file and the second device;
aggregate the first parameter accuracy score and the second parameter accuracy score to produce an aggregated media files and first device type parameters accuracy score; and
cause one or more actions based at least in part on the first parameter accuracy score, the second parameter accuracy score, or the aggregated media files and first device type parameter accuracy score.

8. The computing system of claim 7, wherein the one or more first presented quality scores are determined based at least in part on an encoding of at least a portion of the first media file or a device type of the first device.

9. The computing system of claim 7, wherein the first device and the second device are of a same device type.

10. The computing system of claim 7, wherein:
the program instructions, that when executed by the one or more processors to determine the first plurality of estimated parameters for the first media file, further include instructions that cause the one or more processors to at least determine, for each fragment of a plurality of fragments of the first media file, one or more first estimated parameters; and
the program instructions, that when executed by the one or more processors to determine the first plurality of actual parameters for the first media file, further include instructions that cause the one or more processors to at least determine, for each fragment of the plurality of fragments of the first media file, one or more first actual parameters.

11. The computing system of claim 10, wherein the program instructions, that when executed by the one or more processors to compute the first parameter accuracy score, further include instructions that, when executed by the one or more processors, further cause the one or more processors to at least:
for each fragment of the plurality of fragments:
compute, based at least in part on the one or more first estimated parameters determined for the fragment and the one or more first actual parameters determined for the fragment, one or more first parameter accuracy scores for the fragment.

12. The computing system of claim 11, wherein the program instructions, that when executed by the one or more processors, further include instructions that cause the one or more processors to at least:

in response to a request from the first device, send fragments of the first media file to the first device; and monitor the first actual parameters.

13. The computing system of claim 12, wherein the first plurality of estimated parameters are determined at the first device and based at least in part on a manifest file corresponding to the first media file.

14. The computing system of claim 7, wherein the program instructions, that when executed by the one or more processors, further include instructions that cause the one or more processors to at least:
in response to determining a difference between an estimated parameter of the first plurality of estimated parameters and an actual parameter of the first plurality of actual parameters, adjusting one or more presented quality scores corresponding to the first media file.

15. A method, comprising:
determining one or more first estimated parameters for a first media file, wherein at least one of the one or more first estimated parameters are determined based at least in part on one or more first presented quality scores determined for the first media file, wherein each of the one or more first presented quality scores are indicative of a first predicted quality of at least a portion of the first media file when presented by a first device;
determining, for the first media file, one or more first actual parameters measured during a delivery or a playback of the first media file by the first device;
computing, based at least in part on the one or more first estimated parameters and the one or more first actual parameters, one or more first parameter accuracy scores corresponding to the first media file and the first device;
determining one or more second estimated parameters for a second media file, wherein at least one of the one or more second estimated parameters are determined based at least in part on one or more second presented quality scores determined for the second media file, wherein each of the one or more second presented quality scores are indicative of a second predicted quality of at least a portion of the second media file when presented by a second device, wherein the second media file is different than the first media file;
determining, for the second media file, one or more second actual parameters measured during a delivery or a playback of the second media file by the second device; and
computing, based at least in part on the one or more second estimated parameters and the one or more second actual parameters, one or more second parameter accuracy scores corresponding to the first media file and the second device;
aggregating the one or more first parameter accuracy scores and the one or more second parameter accuracy scores to produce one or more aggregated media files and device type parameter accuracy scores; and
causing one or more actions based at least in part on the one or more first parameter accuracy scores, the one or more second parameter accuracy scores, or the one or more aggregated media files and first device type parameter accuracy scores.

16. The method of claim 15, wherein the one or more first presented quality scores are determined based at least in part on an encoding of at least a portion of the first media file or a device type of the first device.

17. The method of claim 15, wherein the one or more first estimated parameters include one or more of a presented quality, a time delay before starting a streaming of the first media file, an initial streaming quality at the first device, a presented quality at a start of the streaming of the first media file at the first device, a re-buffering risk for the first media file at the first device, an estimated network bandwidth, or a latency.

18. The method of claim 15, wherein the delivery of the first media file is at least one of a streaming of the first media file to the first device for presentation or a download of the first media file to the first device for storage.

19. The method of claim 15, wherein the first media file is at least one of a video media file, an audio media file, an audio/video media file, an image, a trick play file, a thumbnail file, a subtitles file, a captions file, a metadata file, or a virtual reality content file.

20. The method of claim 15, further comprising:
determining one or more third estimated parameters for the first media file, wherein at least one of the one or more third estimated parameters are determined based at least in part on one or more third presented quality scores determined for the first media file, wherein each of the one or more third presented quality scores are indicative of a third predicted quality of at least a portion of the first media file when presented by the second device;
determining, for the first media file, one or more third actual parameters measured during a delivery or a playback of the first media file by the second device;
computing, based at least in part on the one or more third estimated parameters and the one or more third actual parameters, one or more third parameter accuracy scores corresponding to the first media file and the second device; and
aggregating the one or more first parameter accuracy scores and the one or more third parameter accuracy scores to produce one or more first media files aggregated device type parameter accuracy scores for the first media file and a first device type of the first device and the second device.

* * * * *